United States Patent
Brown

(10) Patent No.: US 10,316,881 B2
(45) Date of Patent: Jun. 11, 2019

(54) FASTENERS

(71) Applicant: INTEGRITY ENGINEERING SOLUTIONS PTY LTD, Dunsborough, Western Australia (AU)

(72) Inventor: Ian Warren Brown, Dunsborough (AU)

(73) Assignee: INTEGRITY ENGINEERING SOLUTIONS PTY LTD, Dunsborough, Western (AU)

( * ) Notice: Subject to any disclaimer, the term of this patent is extended or adjusted under 35 U.S.C. 154(b) by 76 days.

(21) Appl. No.: 15/329,163

(22) PCT Filed: Jul. 30, 2015

(86) PCT No.: PCT/AU2015/000452
§ 371 (c)(1),
(2) Date: Jan. 25, 2017

(87) PCT Pub. No.: WO2016/015092
PCT Pub. Date: Feb. 4, 2016

(65) Prior Publication Data
US 2017/0218999 A1    Aug. 3, 2017

(30) Foreign Application Priority Data
Jul. 30, 2014   (AU) .................................. 2014902946

(51) Int. Cl.
*F16B 31/02*    (2006.01)
*B23H 7/28*    (2006.01)
(Continued)

(52) U.S. Cl.
CPC .............. *F16B 31/025* (2013.01); *B23H 7/28* (2013.01); *B23H 9/14* (2013.01); *C21D 1/26* (2013.01);
(Continued)

(58) Field of Classification Search
CPC ...... F16B 1/0071; F16B 31/02; F16B 31/025; G01L 5/24
(Continued)

(56) References Cited

U.S. PATENT DOCUMENTS 2,600,029 A * 6/1952 Stone .................... F16B 31/025
338/2
2,747,454 A * 5/1956 Bowersett ............. F16B 31/021
116/DIG. 34
(Continued)

FOREIGN PATENT DOCUMENTS

| CN | 1088141 | 6/1994 |
|---|---|---|
| EP | 0634243 | 6/1997 |

(Continued)

OTHER PUBLICATIONS

International Search Report and Written Opinion issued in corresponding International Application No. PCT/AU2015/000452 dated Oct. 19, 2015.
(Continued)

*Primary Examiner* — Roberta S Delisle
(74) *Attorney, Agent, or Firm* — Hogan Lovells US LLP

(57) ABSTRACT

A member (10), for bearing a load, including a load receiving portion (12) at which the load is applicable to the member. A strainable portion (14) is connected to the load receiving portion to be strained by the load. A datum (16*a*) is defined and an elongate portion (18) defines another datum (18*a*). The datums are arranged such that relative displacement therebetween indicates an amount by which the strainable portion is strained. The strainable portion defines the datum.

30 Claims, 8 Drawing Sheets

(51) Int. Cl.
*B23H 9/14* (2006.01)
*G01L 5/00* (2006.01)
*C21D 9/00* (2006.01)
*C21D 1/26* (2006.01)
*C21D 1/30* (2006.01)
*B23H 1/00* (2006.01)

(52) U.S. Cl.
CPC ............ *C21D 1/30* (2013.01); *C21D 9/0093* (2013.01); *F16B 31/02* (2013.01); *G01L 5/0004* (2013.01); *G01L 5/0038* (2013.01); *B23H 1/00* (2013.01); *B23H 2400/10* (2013.01)

(58) Field of Classification Search
USPC .......................................... 411/8, 9, 14, 14.5
See application file for complete search history.

(56) References Cited

U.S. PATENT DOCUMENTS

| | | | |
|---|---|---|---|
| 3,622,734 A | | 11/1971 | Mainwaring |
| 3,799,108 A | * | 3/1974 | Mosow .................. F16B 31/02 116/212 |
| 3,850,133 A | * | 11/1974 | Johnson .................. F16B 31/02 116/212 |
| 3,943,819 A | | 3/1976 | Charron |
| 3,954,004 A | * | 5/1976 | Orner .................... G01L 5/0004 73/761 |
| 3,987,699 A | * | 10/1976 | Popenoe ............... F16B 31/025 116/DIG. 34 |
| 4,553,124 A | * | 11/1985 | Malicki ................. F16B 31/025 338/2 |
| 4,630,490 A | * | 12/1986 | Malicki ..................... G01L 1/22 338/5 |
| 4,676,109 A | | 6/1987 | Wallace |
| 4,686,859 A | * | 8/1987 | Wallace .................. B25B 23/14 411/14 |
| 4,823,606 A | | 4/1989 | Malicki |
| 4,847,464 A | | 7/1989 | Moore |
| 5,391,850 A | | 2/1995 | Mueller |
| 6,351,997 B1 | | 3/2002 | Loffler |
| 2006/0263166 A1 | | 11/2006 | Kelly |
| 2009/0151466 A1 | * | 6/2009 | Wu ....................... F16B 31/025 73/761 |
| 2009/0301383 A1 | | 12/2009 | Clarke |

FOREIGN PATENT DOCUMENTS

| | | |
|---|---|---|
| GB | 851706 | 10/1960 |
| GB | 2372826 | 9/2002 |
| JP | 59117906 | 8/1984 |
| JP | 2006-328473 | 12/2006 |
| WO | 1999009327 | 2/1999 |
| WO | 2000/022306 | 4/2000 |
| WO | 2010140002 | 12/2010 |
| WO | 2012097187 | 7/2012 |

OTHER PUBLICATIONS

Office action issued in Chinese Patent Application No. 2015800456943, dated May 22, 2018.
Supplementary European Search Report issued in European Patent Application No. 15827228, dated Mar. 23, 2018.
Sommer, C., et al. "Wire EDM Fundamentals Revolutionizing Machine Wire Electrical Discharge Machines", retrieved from the Internet on Apr. 21, 2011 at [<http://www.reliableedm.com/Complete%20EDM%20Handbook/Complete%20EDM%20Handbook_2.pdf>].

* cited by examiner

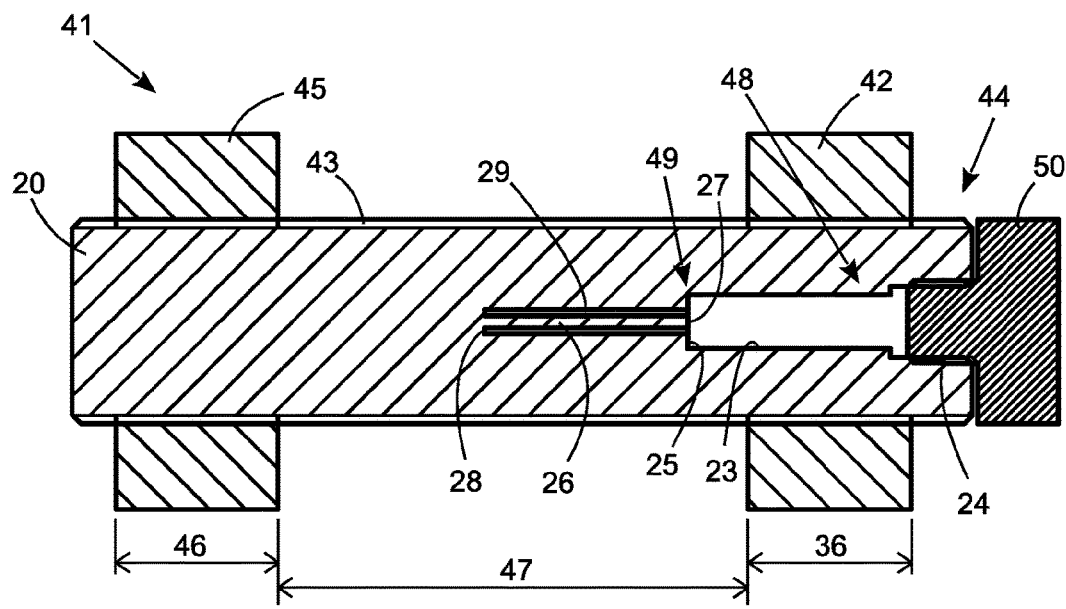
Figure 10
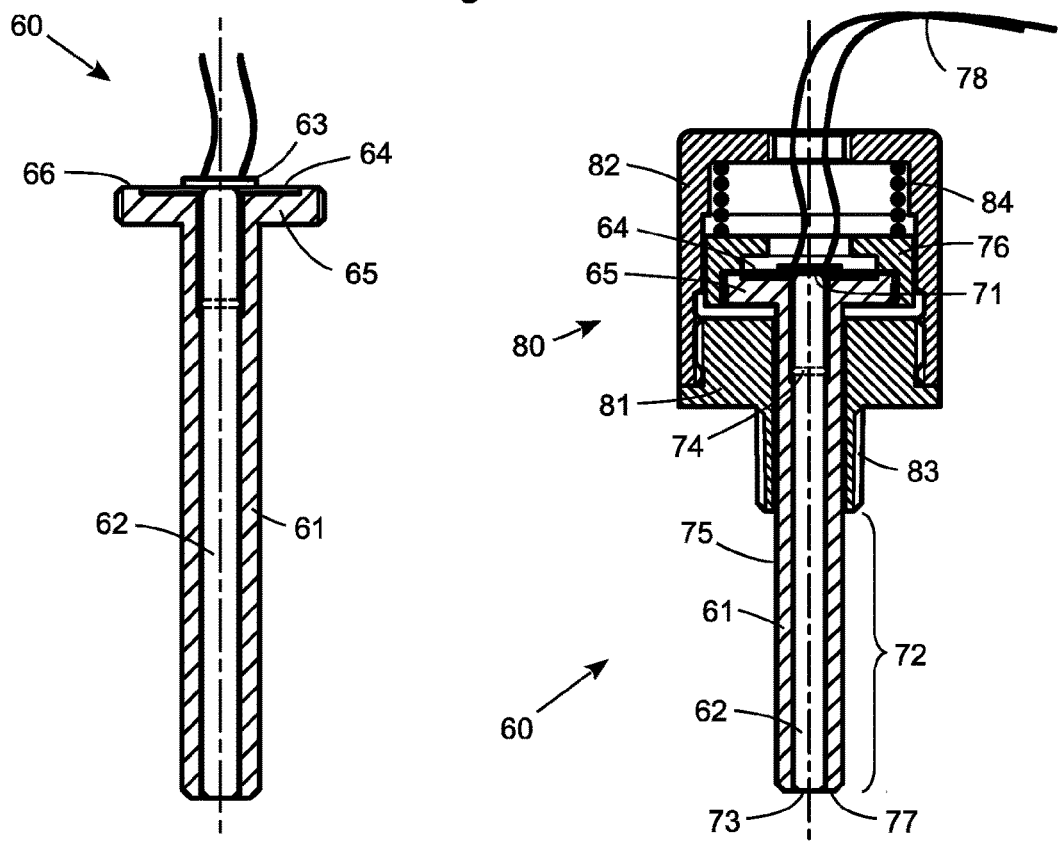
Figure 11
Figure 12

FASTENERS

CROSS REFERENCE TO RELATED APPLICATIONS

This application is a 35 U.S.C. 371 National Stage of International Application No. PCT/AU2015/000452, titled "FASTENERS" filed on Jul. 30, 2015, which claims priority to Australian Application No. 2014902946, titled "LOAD MONITORING", filed on Jul. 30, 2014, all of which are incorporated by reference herein in their entirety.

FIELD

The invention relates to fasteners.

The invention will be described, by way of example, in connection with load indicating bolts and monitoring tensile loads thereon. The invention is not limited to this example; e.g. other examples of the invention may relate to monitoring tensile or compressive loads in members other than bolts. In particular, some examples of the invention may relate to fasteners other than bolts.

"Member" as used herein takes in multi-component members as well as integrally formed members. "Bolt" as used herein takes in bolts with heads, and bolts without heads. Bolts without heads are known as "stud bolts". "Integral" and variants of the term are used herein in their ordinary sense. Accordingly two bodies may be integrated by welding but do not become an integral body by other fastening methods (such as adhesive) that result in discrete mutually fastened (potentially integral) bodies.

BACKGROUND

In some applications it is important to know the load on a bolt, e.g. in applications such as pressure boundary bolted joints (piping and pressure vessel gasketed, flanged, bolted joints).

A bolt that is overloaded can cause failure of joint components, whereas a bolt that is under-loaded may be at risk of fatigue failure, may be indicative of adjacent bolts being overloaded and/or may result in leakage between pieces clamped by the bolt. The load on a bolt can change over time as the nut loosens or the bolt or other aspects of the structure creep. This is particularly the case with joints in vibrating services and high temperature joints. Monitoring the residual bolt load during assembly ensures accurate bolt load is applied and monitoring during operation enables proactive retightening of the bolts as required.

Bolt load monitoring methods tend to fall into two categories, contact measurement methods and non-contact methods. Contact methods use a mechanical means of measuring the relative displacement of two datums, such as a dial gauge or lever-mechanism.

To the inventor's knowledge, all non-contact methods (such as light wave measurement, ultrasonic measurement and capacitive gap measurement) involve measurement tools that (relative to contact tools) are more expensive, more reliant on datum condition to establish a repeatable reading and more susceptible to damage and degradation at elevated temperature.

In the inventor's experience with commercially available bolt load measurement devices, accurate load monitoring requires that each bolt is measured in its unloaded condition to determine an initial relative disposition of the datums. That measurement is retained in a way that it can later be retrieved and correlated with the bolt for subsequent load calculations. In the subsequent calculations, a measured relative disposition of the datums whilst the bolt is under load is compared to the initial relative disposition to determine the relative displacement of the datums associated with the load.

The inventor has recognized that taking an initial measurement, storing and retrieving the information, and performing these calculations is laborious and another potential source of error.

Various contact methods and devices therefor are disclosed in international patent publication no. WO 2010/140002 A1. FIGS. 3, 5 and 4 of that publication are reproduced as FIGS. 1, 2 and 3 herein. To the inventor's knowledge at the time of writing, the device disclosed in FIGS. 2 and 3 does not correspond to any commercially available product. Whilst not well known, this arrangement goes some way to addressing problems related to the location of the nut.

FIG. 1 shows a bolt 1 carrying a pair of nuts 2. The bolt 1 is a stud bolt having a continuous external thread along its entire length.

A strainable portion 3 of the bolt is bracketed by the nuts 2. When the nuts are tightened to compress a structure (not shown, e.g. two mating flanges of a joint), load is applied to the bolt 1 via the threading engagements of the bolts and the nuts. The portions of the bolts underlying the nuts and including the relevant threaded portions constitute load receiving portions of the bolt 1.

The applied load places the bolt in tension, causing it to strain (or more specifically to extend). "Strain" as used herein refers to a change in a dimension expressed as a proportion of that dimension. It does not imply damage or approaching breakage. Within the elastic range of the material, strain is directly relatable to load via the elastic properties of the material.

The bolt 1 includes a bore, running along most of its length, in which a pin 4 is carried. The inner end of the pin is threadingly engaged with the strainable portion 3. This threading engagement is at the root of the pin. The other end of the pin is a free end adjacent the upper (as drawn) end of the bolt.

The free end of the pin and the upper end of the bolt are datums. When the bolt is stretched, the pin (which remains unstressed) recedes into the bolt 1. This recession can be measured with a dial gauge 6 and indicates an amount by which the strainable portion is strained.

The amount of recession depends on the location of the nut. The location of the nut can vary, depending on the thickness of the clamped structure. Calculations to correct for such variations are laborious and a potential source of error.

In the device of FIGS. 2 and 3 only a lower (as drawn) end of the sleeve 8 is anchored in to the bore of the strainable portion so that the top (as drawn) of the pin and the sleeve provide datums from which measurements unaffected by the position of the nut may be taken.

Various non-contact methods and devices therefor are disclosed in UK patent application no. GB 2 372 826 A. Again, to the inventor's knowledge these devices do not correspond to any commercially available products.

FIGS. 2 and 4 of UK patent application no. GB 2 372 826 A are reproduced as FIGS. 4 and 5 herein. A gauge pin 4 within a bolt is disclosed. The end surface 10 of the pin is prepared to reflect light in a manner indicative of axial movement. The pin is potentially integral with the bolt and formed by machining out surrounding material. A fibre optic probe 12 conveys light reflected from the pin to an imaging spectrometer to obtain an indication of the axial movement.

The variant of FIG. 2 of UK patent application no. GB 2 372 826 A (herein FIG. 4) incorporates a recess 14 dimensioned for a close sliding fit with the probe. This recess is said to engage with and align the probe.

The variant of FIG. 4 of UK patent application no. GB 2 372 826 A (herein FIG. 5) shows a bore such that the gauge pin 4 is wholly within the strainable portion of the bolt. The bore is enlarged to define a step 16 adjacent the end 10 of the gauge pin. Appreciable radial clearance between the probe and the bore is illustrated. A compression spring 18 is loaded by a collar to bias the probe against the step to fixedly locate the probe relative to the step.

In this art, a bore such as the bore of FIG. 4 of UK patent application no. GB 2 372 826 A (herein FIG. 5) would typically, if not universally, be formed by drilling. Drilling, when performed carefully by a skilled machinist using high quality tools and equipment, can be expected to produce a bore having an H10 tolerance at best, that is a bore the widest and narrowest locations of which fall within the H10 range. In practice, the tolerance would likely be wider than H10 because there is no apparent reason to incur the expense of maintaining a narrow tolerance.

To the inventor's knowledge, at the time of writing the use of contactless machining to form load indicating fasteners was not publicly known. Contactless machining is an umbrella term taking in Electro-Discharge Machining (EDM), Electro-Chemical Machining (ECM) and laser machining.

Sinker EDM entails a shaped electrode (tool) being held at a high voltage relative to a workpiece and slowly moved towards the workpiece so that an arc is formed between the two. This arc has the effect of eroding the workpiece into a shape complementary to the shape of the electrode. Typically the electrode and relevant portions of the workpiece are bathed in a dielectric fluid and arcs form when the dielectric fluid breaks down.

U.S. Pat. No. 4,847,464 discloses the use of sinker EDM to form a spinneret capillary. International patent publication number WO 2012/097187 discloses EDM disintegration to remove residual tap, bolt or rivet materials. U.S. Pat. No. 5,391,850 discloses drilling small diameter holes with high accuracy using fast-hole EDM.

Fast-hole EDM entails rotating and advancing a tubular electrode through which dielectric fluid is pumped. Fast-hole EDM can be used to create through holes and blind holes. To create a through hole, an electrode having a simple annular cross-section may be used. To create blind holes, more elaborate electrodes are used to ensure material at and about the axis of rotation is removed. Examples of such electrodes are described in U.S. Pat. No. 3,622,734 A and European patent publication number EP0634243.

The inventor's investigations have entailed confidentially contacting numerous persons skilled in the art of EDM, including many experienced machinists. This investigation has revealed that EDM and other contactless methods are generally considered unsuitable for forming formations similar to the gauge pin of UK patent application no. GB 2 372 826. Indeed the vast majority of the machinists contacted were confident that EDM was not feasible for this purpose:

Most considered sinker EDM technology to be much too slow (i.e. expensive), e.g. forming a 25 mm long pin by this method is generally considered to take more than 2 hours.

EDM disintegration is generally considered to be inaccurate, so much so that if applied to machining out surrounding material to form a gauge pin, it is doubtful that any pin would be left at all.

Likewise fast-hole EDM is generally considered to be unsuitable for leaving an intact central pin. When using a "through hole" electrode, the material from at and about the axis of rotation is typically a misshapen unwanted by-product tapered by preferential erosion at its leading end. Typical "blind hole" methods destroy the material at and about the axis of rotation.

Forming the step 16 and end 10 (of the gauge pin 4) of UK patent application no. GB 2 372 826 A (herein FIG. 5) with any degree of accuracy presents some challenges. The present inventor considers that it would not be commercially feasible to do so using conventional methods. Machining at the bottom of a relatively long slender hole is required. This is problematic for most conventional methods. It means long slender tools, which means higher speed, very small cuts and lots of small movements required. Micro-milling is one option, but it is considered too slow (i.e. expensive) to be commercially feasible.

It is not admitted that any of the information in this patent specification is common general knowledge, or that the person skilled in the art could be reasonably expected to ascertain or understand it, regard it as relevant or combine it in any way at the priority date.

SUMMARY

One aspect of the invention provides a fastener, for bearing a load, including
load receiving portions at which the load is applicable to the fastener;
a strainable portion connected to the load receiving portions to be strained by the load;
a datum; and
an elongate portion defining another datum;
the datums being arranged such that relative displacement therebetween indicates an amount by which the strainable portion is strained;
the strainable portion defining the datum; and
when the fastener is not loaded, an axial distance from a highest point of the datum to a highest point of the other datum being less than $1/1000^{th}$ of an axial distance from the datum to a root of the elongate portion.

Another aspect of the invention provides a fastener, for bearing a load, including
load receiving portions at which the load is applicable to the fastener;
a strainable portion connected to the load receiving portions to be strained by the load;
a datum; and
an elongate portion defining another datum;
the datums being arranged such that relative displacement therebetween indicates an amount by which the strainable portion is strained;
the strainable portion defining the datum; and
the datums being substantially co-planar when the fastener is not loaded.

Preferably, when the fastener is not loaded, an axial distance from the highest point of the datum to the highest point of the other datum is less than $1/2000^{th}$, and more preferably less than $1/4000^{th}$, of the axial distance from the datum to the root of the elongate portion.

Another aspect of the invention provides a fastener including:

a first and a second load receiving portion;
a strainable portion between the first and second load receiving portions;
an elongate portion including a reference datum;
a strain portion datum located on the strainable portion;
axial displacement of the strain portion datum relative to the reference datum being proportional to a load on the fastener; and
when the load is zero, the axial distance from the highest point of the reference datum to the highest point of the strain portion datum is less than 1/1000th of an axial distance from the reference datum to a root of the elongate portion.

Preferably the elongate portion is located within the strainable portion, and most preferably the root of the elongate portion, the reference datum and the strain portion datum are located between the first and second load receiving portions.

The fastener may include a hole from a measuring access end of the fastener to the reference and strain portion datums, the hole including a bore having a tolerance of no more than H9.

Preferably the bore has a radial run-out tolerance relative to the reference pin of less than $1/200^{th}$ of the axial distance from the reference datum to the root of the elongate portion.

Another aspect of the invention provides a method of forming a fastener;
the fastener being for bearing a load and including
load receiving portions at which the load is applicable to the fastener;
a strainable portion connected to the load receiving portions to be strained by the load;
a datum; and
an elongate portion defining another datum and being integrally formed with the strainable portion;
the datums being arranged such that relative displacement therebetween indicates an amount by which the strainable portion is strained;
the method including removing material to define the datums; and
the removing material being contactless machining to remove material.

Preferably the contactless machining includes moving, relative to the fastener, a machining tool;
the machining tool having a functional area which acts to form the datums;
the moving being moving at least a portion of the functional area over, to act on, both of the datums to limit relevant process variation associated with wearing of the machining tool;
the relevant process variation being variation in an axial disposition of a highest point of the datum relative to a highest point of the other datum.

The moving may include rotating the fastener relative to the machining tool whilst the tool is laterally offset relative to the elongate portion and/or rotating the machining tool relative to the fastener whilst the tool is laterally offset relative to the elongate portion. The rotating the machining tool relative to the fastener is preferably counter to the relative rotation of the fastener and/or or at a rate different relative to a rate at which the fastener is rotated relative to the tool. The moving may include relative lateral stroking.

Another aspect of the invention provides a method of forming a fastener;
the fastener being for bearing a load and including
load receiving portions at which the load is applicable to the fastener;
a strainable portion connected to the load receiving portions to be strained by the load;
a datum;
an elongate portion defining another datum and being integrally formed with the strainable portion; and
the datums being arranged such that relative displacement therebetween indicates an amount by which the strainable portion is strained;
the method including removing material, to define the datums, in a single machining set up.

Another aspect of the invention provides a method of forming a fastener, having a strainable portion, including applying a load to, and for a period heating, the strainable portion;
the load, characteristics of the heating, and the period being selected to relax the strainable portion such that the fastener is capable of a nominal in service relaxation not more than a limit;
the nominal in service relaxation being
 a reduction in stress within the strainable portion;
 over a 5 year period at 80% of a creep temperature of the strainable portion; and
 from an initial stress, within the strainable portion, of 50% of a yield stress of the strainable portion;
the limit being 10% of the initial stress.

Another aspect of the invention provides a method of forming a fastener, having a strainable portion, including applying a load to, and for a period heating, the strainable portion;
the load, characteristics of the heating, and the period being selected such that at the end of the period creep/relaxation rate of the strainable portion is less than $4\times10^{-7}$ m/m/hr.

The applied load is between a design load, to which the fastener is to be subject in use, and the elastic limit of the strainable portion. The heating is preferably to a temperature between a design temperature, to which the fastener is to be subject in use, and an annealing temperature of the strainable portion.

Preferably the upper limit is selected to substantially avoid adversely affecting a microstructure of the strainable portion. The application of load may be tightening the fastener to clamp an item and the method may include further tightening during the period.

Another aspect of the invention provides a method of forming a fastener having a strainable portion, including the steps of:
heating the fastener to at least 80% of a creep temperature of the fastener;
applying a pre-relaxation load to achieve at least 50% of a yield stress of the fastener within the strainable portion.

The method may include the step of reapplying the pre-relaxation with the fastener heated to at least 80% of creep temperature or reapplying the pre-relaxation load and reheating to least 80% of creep temperature.

The method may include the step of reapplying the pre-relaxation load during a total heating time of the fastener.

Preferably the heating is heating in an oven.

Another aspect of the invention provides a fastener formed in accordance with any one of above methods.

The fastener preferably includes a bore to enable a measuring tool to access the datums to check the load;
the bore having one or more tool engaging portion(s) to form an engagement to align the tool.

Preferably, the tool engaging portion(s) have tolerance(s) no wider than H9, or more preferably no wider than about H6. Most preferably the tool engaging portion(s) have tolerance(s) no wider than H9(E).

For the avoidance of doubt, engineering fits between the tool and the bolt are described herein in terms substantially consistent with the RC fits defined by the American National Standards Institute (ANSI) or the IT fits defined by the International Organization for Standardization (ISO) and take in equivalent fits between non-cylindrical parts. Similarly tolerances for features such as the bore in the bolt and the outer surface of the probe portion of the measuring tool are described herein in terms substantially consistent with the ISO H fits for holes and the ISO f, g or h fits for shafts and take in equivalent fits between non-cylindrical parts.

The tool engaging portion(s) are preferably configured to engage the tool at at least two locations spaced by an axial length at least equal, or preferably at least equal to 1.5 times, to the square root of the cross-sectional area of the bore.

Another aspect of the invention provides a system including the fastener a measuring tool.

The engagement between the measuring tool and the bore is preferably at loosest a running fit, or more preferably at loosest substantially an RC 6 running fit.

Another aspect of the invention provides a system including
a fastener for bearing a load; and
a tool for measuring the load on the fastener;
the fastener including
  load receiving portions at which the load is applicable to the fastener;
  a strainable portion connected to the load receiving portions to be strained by the load;
  a datum;
  an elongate portion defining another datum; and
  a bore through which the tool may access the datums;
the datums being arranged such that relative displacement therebetween indicates an amount by which the strainable portion is strained;
the strainable portion defining the datum;
the bore being dimensioned to engage the tool to align the tool;
the tool being configured to produce a read out value; and
the engagement being translational sliding engagement to substantially eliminate variation in the read out value.

Another aspect of the invention provides a system including
a fastener for bearing a load; and
a tool for checking the load on the fastener;
the fastener including
  load receiving portions at which the load is applicable to the fastener;
  a strainable portion connected to the load receiving portions to be strained by the load;
  a datum;
  an elongate portion defining another datum; and
  a bore through which the tool may access the datums;
the datums being arranged such that relative displacement therebetween indicates an amount by which the strainable portion is strained;
the strainable portion defining the datum;
the bore having a cross-sectional area and being dimensioned to, at at least two locations spaced by an axial length, engage the tool to align the tool;
the engagement being at loosest substantially an RC 6 running fit; and
the axial length being at least equal to the square root of the cross-sectional area.

The engagement is preferably at loosest substantially a sliding fit.

The fastener and the tool may include features co-operable to limit rotation of the tool relative to the fastener.

The tool may include a portion for contacting the datum and another portion for contacting the other datum.

Another aspect of the invention provides a method of checking a load on a fastener;
the fastener including
  load receiving portions at which the load is applicable to the fastener;
  a strainable portion connected to the load receiving portions to be strained by the load;
  a datum;
  an elongate portion defining another datum; and
  a bore;
the datums being arranged such that relative displacement therebetween indicates an amount by which the strainable portion is strained;
the strainable portion defining the datum;
the method including inserting, into the bore to access the datums, a tool configured to respond to a relative disposition of the datums to produce a read out value;
the inserting including engaging the tool with the bore; and
the engagement being translational sliding engagement to substantially eliminate variation in the read out value.

Another aspect of the invention provides a method of checking a load on a fastener;
the fastener including
  load receiving portions at which the load is applicable to the fastener;
  a strainable portion connected to the load receiving portions to be strained by the load;
  a datum;
  an elongate portion defining another datum; and
  a bore;
the datums being arranged such that relative displacement therebetween indicates an amount by which the strainable portion is strained;
the strainable portion defining the datum;
the method including inserting, into the bore to access the datums, a tool responsive to a relative disposition of the datums;
the inserting including engaging, at at least two locations spaced by an axial length, the tool with the bore to align the tool;
the engagement being at loosest substantially an RC 6 running fit; and
the axial length being at least equal to the diameter.

Another aspect of the invention provides a tool for checking the load on a fastener;
the fastener including
  load receiving portions at which the load is applicable to the fastener;
  a strainable portion
    connected to the load receiving portions to be strained by the load; and
    defining a datum;
  an elongate portion defining another datum; and
  a bore having a cross-sectional area;
the datums being arranged such that relative displacement therebetween indicates an amount by which the strainable portion is strained;
the bore passing through the load receiving portion;
the tool including one or more portions shaped to engage the bore to align the tool;

the engagement being at at least two locations spaced by an axial length at least equal to the square root of the cross-sectional area, and
the bore engaging portions having tolerance(s) no wider than e8.

Preferably the tool including
a deformable portion;
two datum contacting portions extending away from the deformable portion to pass through the bore to contact the datums; and
a strain gauge;
the datum contacting portions being movable relative to each other to simultaneously engage both datums;
the deformable portion being arranged to be deformed by the relative movement; and
the strain gauge being arranged to provide an indication of the deformation.

Another aspect of the invention provides a tool for checking the load on a fastener;
the fastener including
load receiving portions at which the load is applicable to the fastener;
a strainable portion
connected to the load receiving portions to be strained by the load; and
defining a datum;
an elongate portion defining another datum; and
a bore;
the datums being arranged such that relative displacement therebetween indicates an amount by which the strainable portion is strained;
the bore passing through the load receiving portion;
the tool including
a deformable portion;
two datum contacting portions extending away from the deformable portion to pass through the bore to contact the datums; and
a strain gauge;
the datum contacting portions being movable relative to each other to simultaneously engage both datums;
the deformable portion being arranged to be deformed by the relative movement; and
the strain gauge being arranged to provide an indication of the deformation.

The deformable portion may be a diaphragm. Preferably the tool includes
a threaded portion for threadingly engaging the fastener; and
a bias for biasing, relative to the threaded portion, one of the datum contacting portions towards one of the datums.

Another aspect of the invention provides a method of forming a fastener;
the fastener being for bearing a load and including
load receiving portions at which the load is applicable to the fastener;
a strainable portion connected to the load receiving portions to be strained by the load;
a datum;
an elongate portion defining another datum and being integrally formed with the strainable portion; and
the datums being arranged such that relative displacement therebetween indicates an amount by which the strainable portion is strained;
the method including removing material to define a void surrounding the elongate portion;
the removing material being contactless machining to remove material.

Another aspect of the invention provides a method of forming a fastener;
the fastener being for bearing a load and including
load receiving portions at which the load is applicable to the fastener;
a strainable portion connected to the load receiving portions to be strained by the load;
a datum;
an elongate portion defining another datum and being integrally formed with the strainable portion; and
a bore;
the datums being arranged such that relative displacement therebetween indicates an amount by which the strainable portion is strained;
the bore being a bore through which a tool may access the datums to check the load;
the method including
removing material to define a pre-cursor to the bore; and
a subsequent operation, more accurate than the removing, to define the bore.

Also disclosed is an automatic load maintaining system for maintaining the load on a member;
the member including
a load receiving portion at which the load is applicable to the member
a strainable portion connected to the load receiving portion to be strained by the load;
a datum; and
an elongate portion defining another datum;
the datums being arranged such that relative displacement therebetween indicates an amount by which the strainable portion is strained;
the system including
a sensor configured to sense the relative displacement; and
a load varying mechanism configured to vary the load in response to the sensor.

Also disclosed is a method, of checking the load or strain on the member, including measuring a relative disposition of the datums.

Also disclosed is the use of the tool to check load or strain on the member.

Also disclosed is a member configured for a load on the member, when the member is loaded, to be checked using a tool configured to check the load on another member;
each of the members being for bearing a load and including
a load receiving portion at which the load is applicable to the member;
a strainable portion connected to the load receiving portion to be strained by the load;
a datum;
an elongate portion defining another datum;
the datums of each respective member being arranged such that relative displacement therebetween indicates an amount by which the strainable portion of the respective member is strained;
the member, relative to the other member, having
one or both of different material properties and a different cross-sectional area of its strainable portion, and
different geometry selected to accommodate the one or both of different material properties and a different cross-sectional area of its strainable portion.

Preferably a distance, from the datum of the member to a root of the elongate portion of the member, differs from a distance from the datum of the other member to a root of the elongate portion of the other member. Most preferably, the difference in the distances is so the member, relative to the other member, has substantially identical load versus datum-relative-displacement characteristics to permit measurement, of load on each of the members, with the same tool.

Also disclosed is a bolted joint including a member of, or formed in accordance with, one of the foregoing aspects of this disclosure.

BRIEF DESCRIPTION OF DRAWINGS

An embodiment of the apparatus will now be described by way of example only with reference to the accompanying drawings in which:

FIG. 10 is a section view of a stud bolt with an end cap;

FIG. 11 is a cross-section view of a measuring portion of a tool;

FIG. 12 is a cross-section view of an assembled measuring tool;

DESCRIPTION OF EMBODIMENTS

Figure 6:
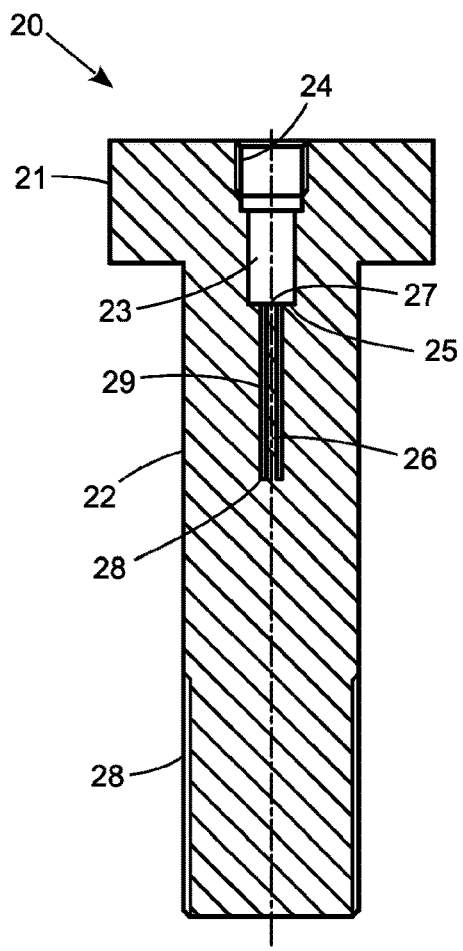
FIG. 6 is a cross-section view of a portion of a bolt.

FIG. 6 illustrates a bolt 20 including a head 21, a shank 22 and a threaded portion 30. The shank 22 constitutes a strainable portion. When the bolt is tightened, and thus under load, the shank 22 will strain appreciably whereas there will be much less deformation within the head 21 and any deformation within the head 21 will be more complex.

The bolt 20 is a single integral body of material machined from a single block of steel.

A bore 23 opens from the end face of the head 21 and is coaxial with the head 21 and shank 22. The bore 23 has a stepped profile. The outer end of the bore is internally threaded, forming a retaining region 24. From this outer end the bore steps down to a reduced diameter before terminating at its inner end 25. The inner end 25 is a planar face perpendicular to the axis of the bolt and, as will be described, constitutes a datum, specifically the strainable portion datum 25.

A pin 26 sits within the shank 22, the pin typically being referred to as a gauge pin or reference pin 26. The reference pin 26 extends upwardly (as drawn) from its root 28 to its free end 27. The free end 27 is a planar face perpendicular to the axis of the bolt. The free end 27 constitutes a datum, specifically the reference datum 27. In this example, when the bolt is unloaded the datums 25, 27 are in co-planar alignment. Advantageously this alignment leads to the elongation of the relevant portion (i.e. the datum to the root portion) of the strainable portion being the difference between the position of the strainable portion datum 25 relative to the reference datum 27, and is typically directly proportional to the load in the bolt.

Figures 1, 2, 3:
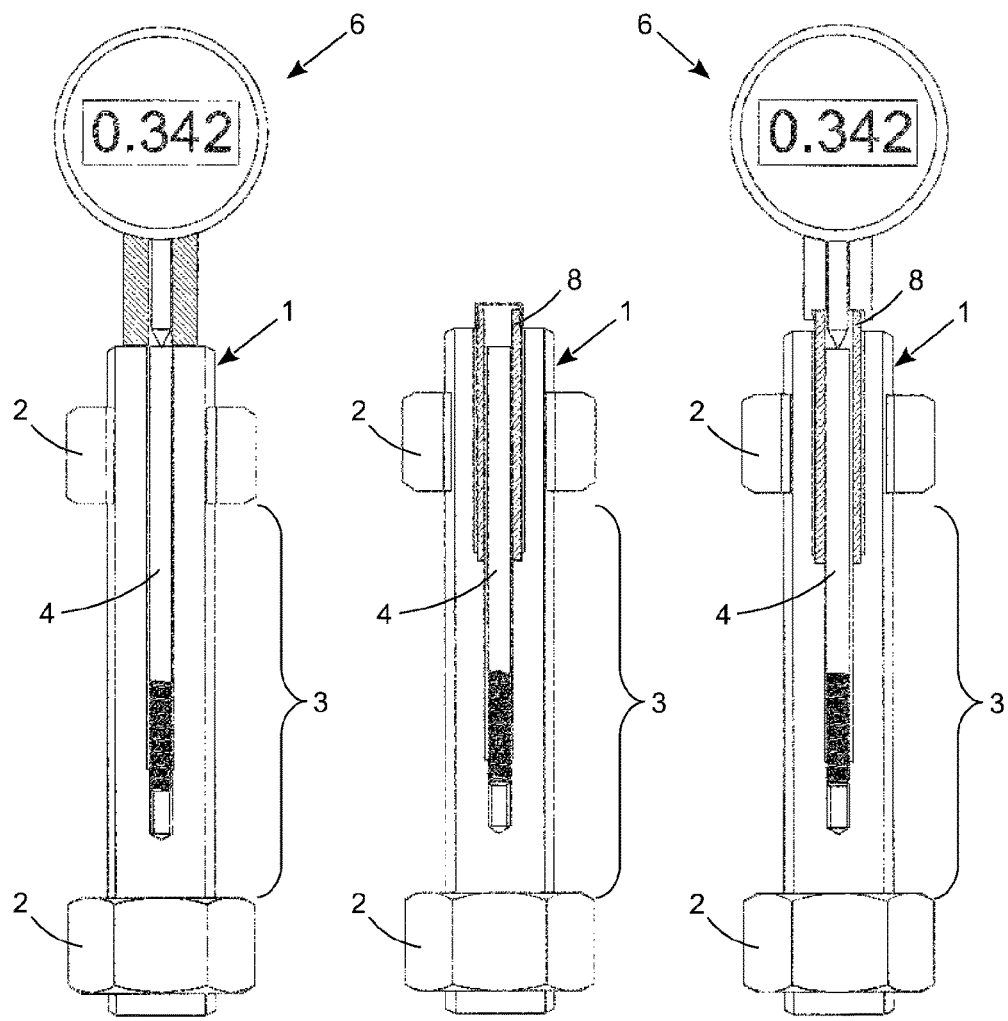
FIG. 1 is a partially cut away side view of a prior art bolt and measuring tool.
FIG. 2 is a partially cut away side view of a prior art bolt.
FIG. 3 is a partially cut away side view of the bolt of FIG. 2 and a measuring tool.

Other examples of the invention may take the form of a stud bolt akin to the bolt of FIG. 1 in which the head 21 of the bolt of FIG. 6 is replaced by an externally threaded portion, forming the first load receiving portion, as shown in FIG. 10, co-operable with a nut (not shown). In these examples, by locating the datum 25 within the strainable portion, rather than within or beyond the load receiving portion underlying the nut as in FIGS. 1 to 3, complexities related to the location of the nut and the complex strain field in the region underlying the nut are avoided. This region is sometimes referred to as "dead length".

The bore 23 and pin 26 are preferably formed by a series of machining operations including drilling, reaming, tapping and EDM. Firstly, most of the bore 23 is drilled. The bore is then reamed to size. Reaming typically produces about an H6 tolerance and a surface finish up to a maximum of Ra 2 µm AARH. A maximum of Ra 2 µm AARH is the preferred surface finish regardless of how the bore is formed. Whilst reaming is the preferred secondary bore forming operation, other processes such as honing, boring and/or grinding may also be suitable.

The retaining region 24 is formed in the end portion by tapping to define a female thread about its cylindrical wall. Following those operations, a portion 29 of material that is itself tubular is machined out to define the reference pin 26. The datums 25, 27 are then formed in a single machining set up, by EDM in this example.

Whilst EDM is employed in this example of the invention, other forms of contactless machining may be employed in place of one or more of the described machining operations.

The removed material 29 is an annulus of removed material such that the pin 26 is cylindrical, although other shapes are possible.

The annulus of material is preferably removed (to define the pin 26) using a variant of fast-hole EDM. An electrode that is cylindrical and tubular is axially advanced towards the workpiece. In contrast to conventional thought in the field of EDM, the inventor has found this method to be commercially feasible. By using a relatively thin-walled electrode, holding that electrode at a relatively lower voltage and reducing the rate at which the electrode is advanced, commercially satisfactory results have been achieved.

Once supplied with this knowledge, persons of skill in the art have no difficulty implementing this process. Indeed, the inventor confidentially reverted to a number of the machinists who suggested that EDM was not suitable, and once supplied with this knowledge those machinists were in fact able to produce a sample pin in a commercially acceptable timeframe.

The pin and exterior of the shank are preferably aligned within the one or more (and preferably all) of the following tolerances:

Bolt alignment bore tolerance=total radial run-out relative to the reference pin to be within $\frac{1}{200}^{th}$ of reference pin length or more preferably within $\frac{1}{600}^{th}$ of reference pin length;

Pin alignment tolerance=coaxial to the bolt to within $\frac{1}{60}$th of reference pin length; and End of pin alignment=concentric to the bolt alignment bore to within half the gap between the pin and outer datum (this in conjunction with a similar tolerance applied to the measuring tool ensures that of a bolt's two datums, each of the tool's datum two contacting portions contacts only its respective target datum).

Experimentation has shown that these tolerances are not only achievable, but are practical, using the described variant of fast-hole EDM.

In one example, the annular material could be removed (to define the pin) during the same EDM operation during which the datums 25, 27 are formed. To form this shape, the electrode would have planar faces corresponding to the faces 25, 27 and a tubular extension corresponding to the removed material 29. More preferably, a tubular electrode is used to form the void 29 (as described above) and a separate cylindrical electrode having a planar end face brought in to define the datums 25, 27.

The datums could be formed using sinker EDM, that is the separate cylindrical electrode could correspond in diameter to the datum 25 so that a central portion of its end face is for the reference datum 27 and an outer annular portion of that face is for the strainable portion datum 25. Of course the surfaces of the electrode(s) would be offset from the surfaces of the bolt 20 by a distance corresponding to the arc distance.

Whilst conventional sinker EDM could be so employed and would be advantageous over many other methods, the inventor has recognized the potential for relevant error in that the end face of the electrode may well wear to some non-planar shape. In particular the electrode's central portion may erode at a different rate to its outer annular portion. Such erosion would result in a change in the relative disposition of the datums 25, 27 which (if left unchecked) would impact upon load measurement accuracy. The inventor's experiments suggest that conventional sinker EDM could be expected to maintain the axial disposition of the high point of one datum to the high point of the other datum within a tolerance of about 0.13 mm at best. 0.13 mm corresponds to about $\frac{1}{200}^{th}$ of a 25 mm reference length.

The inventor has recognized that this wear problem can be addressed, and very accurately aligned datums can be achieved, by relatively moving at least a portion of the functional area of the electrode over, to act on, both of the datums 25, 27. One implementation of this concept is illustrated in FIGS. 7, 8 and 9.

A cylindrical electrode 35 is placed parallel to but offset from the centerline 34 of datums 25 and 27. The diameter of the electrode 35 is preferably smaller than the bore diameter but larger than half of the bore diameter. The centerline 34 corresponds to the axis of pin 26, which also corresponds to the axis of the bolt in this example. The electrode 35 could be a solid cylindrical electrode, the end portion of which is bathed in a suitable dielectric. Alternatively, as suggested in FIG. 9, a hollow electrode may be used.

Figure 9:
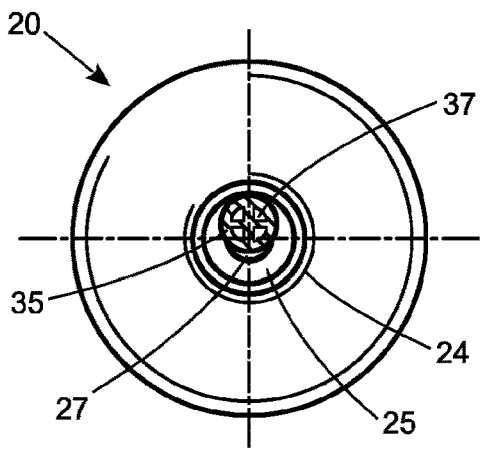
FIG. 9 is an end view of a bolt with a cross-section through another EDM electrode.

FIG. 9 shows an alternative form of electrode, being fluid cooled by galleries 37 running inside the electrode 35. By passing fluid through the galleries the EDM can be performed without a bath, since the fluid passes from the galleries to flush between the electrode and the surfaces being machined.

Figure 7:
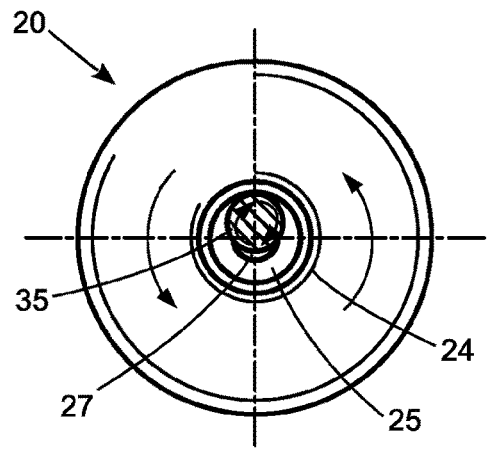
FIG. 7 is an end view of a bolt with a cross-section through an EDM electrode.
Figure 8:
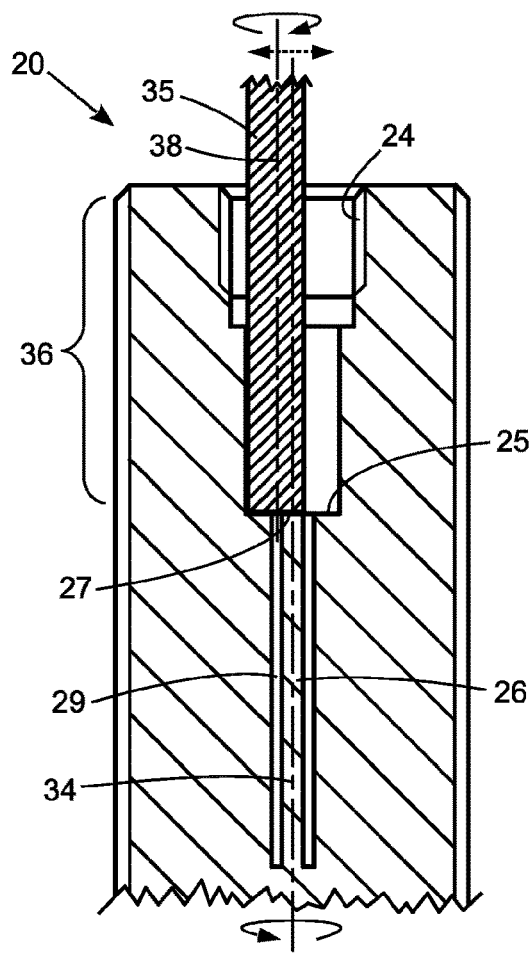
FIG. 8 is a cross-section view of a portion of a bolt and electrode of FIG. 7.

The advantageous relative movement is suggested by the arrows in FIGS. 7 and 8 and is the combination of two or three distinct movements:

the electrode 35 is rotated about its axis in one direction (clockwise as drawn in this example);

the bolt 20 is rotated about its axis in the opposite direction (anti-clockwise as drawn in this example); and the electrode 35 is optionally laterally stroked (i.e. moved in a direction perpendicular to the axis of the bolt) or more specifically (in this example) stroked radially relative to the axis of the bolt.

As part of this movement, respective portions of the functional area repetitively pass over one of the datums and then the other. Relative to other simpler movements, each of these respective portions traverses a greater area of the datum surfaces.

This relative movement limits, or in preferred implementations substantially avoids, the adverse consequences of machining tool wear. By way of example, if the end face of the machining tool were to wear to a concave shape, the remaining circular rim would continue to act on the workpiece to accurately produce flat co-planar datums. On the other hand, if the end face were to wear to a convex shape, the stroke and diameter of the electrode can be adjusted so that substantially the same outer annular region defines the outer datum 25 and a central portion of the inner datum 27, whereby the axial relative disposition of the highest points of the datums can be very tightly controlled.

For the avoidance of doubt, "high point" and "highest point" and variants of those terms are used herein in their ordinary sense in the context of machined components to refer to the points that would be picked up by a contact measuring tool. These points are independent of the orientation of the workpiece.

Experimentation has shown that electrodes and bolts mutually wear each other, such that in practice the electrode wears more uniformly than in conventional EDM processes, such that functional area remains relatively planar. It is contemplated that some rounding would occur about the circular perimeter of the functional area, although this has not be noticeable in the experimental results and is adequately accounted for by routine corner treatment (e.g. chamfering or rounding) of the leading circular edge of the measurement tool to clear any corresponding rounding of the corner connecting the outer datum 25 to the cylindrical wall of the bore portion 23.

Each of the datum surfaces preferably has a maximum axial run-out of $\frac{1}{100}^{th}$ of the distance from the datum of the member to the root of the pin, regardless of how it is formed. This limits variations in measurement associated with rotatable measurement tools. The described EDM process has been found to produce a satisfactory axial run-out.

Beyond limiting the adverse effects of machining tool wear, the described relative motion offers the further benefit in that the dielectric fluid is in continual motion. This improves the quality of the fluid in the critical region in which arcing occurs, by more effectively flushing away eroded material and limiting the formation of bubbles and other localized effects. In turn, a better surface finish is achieved which further contributes to the accuracy of the initial disposition of the datums. In particular, rotation of the bolt is thought to aid in the removal of the machined waste due to the centrifugal forces associated with this rotation.

To emphasize, it is motion of the machining tool relative to the bolt that is most important. Aside from the mentioned centrifugal forces, similar benefits could be obtained by holding one of the tool and the bolt stationary and suitably modifying the motion of the other of the tool and the bolt.

By combining aspects of sinker EDM and fast-hole EDM methods as described, maintaining suitable machine settings, selecting appropriate electrode dimensions, selecting suitable dielectric fluids and the incorporation of an offset electrode with counter-rotation of the work-piece and the electrode for machining the datum surfaces, it is possible to use EDM to produce a load-indicating bolt in a commercially viable mass-production process (i.e. within 2 to 3 minutes per bolt for the entire EDM process). Once supplied with the knowledge in this patent specification, persons of skill in the art will have no difficulty selecting and controlling these parameters.

The separate annulus-forming and datum-forming machining operations can be completed using the same EDM power supply and control system.

By forming both datums in a single machining set up the initial relative disposition of the datums 25, 27 is very tightly controlled. The manufacturing process can include checking the relative disposition of the datums and re-machining if that disposition is outside of a predetermined tolerance, although often re-machining is not required. For practical purposes, process variation is eliminated.

The initial relative disposition can be controlled tightly enough that, for most purposes, there is no need to know the history of the bolt, e.g. no need to measure the initial relative disposition or to track this information. Thus the labour and potential for error associated with measuring, tracking and calculating the unloaded relative disposition of the datums is eliminated. This is particularly advantageous in the context of quality assurance activities entailing random inspection.

The described process can be automated and relatively straightforward, meaning that bolts may be produced by a standard machine shop. There is no need for specialist calibration or a specialist fabricator.

In the finished member, both datums are defined by the same integral body of material. Thus the errors inherent in multi component constructions are avoided. These avoided errors include both initial production variations and longer term variations. In the longer term, connections such as threaded connections and force fitted pins can work loose when subject to vibration and/or thermal cycling. For example, with reference to FIG. 1, if the threaded connection at the root of the pin were to work loose, the measured degree of recession would be reduced which may lead to a false measurement and over tightening of the bolt and in turn failure of the bolt. Also the labour costs of the assembly steps have been avoided. For example, with reference to FIGS. 1 to 3, the costs and errors associated with threadingly engaging a pin and inserting a sleeve are avoided.

Formation of the pin 26 and the strainable portion 22 by the same machining process and as part of the same integral body also reduces errors associated with differential thermal expansion. For example, even if the pin of FIG. 1 were formed of nominally the same material as the shank, differences in the fabrication techniques used to make these components can lead to different coefficients of expansion. Such formation also ensures that the pin and the strainable portion have a similar tolerance for operating conditions such as temperature and other environmental factors. Moreover, in at least preferred forms of the member, the datums 25, 27 and the root 28 of the pin 26 are all within the strainable portion of the member so as to most likely be at substantially the same temperature. This reduces the errors associated with temperature differences.

The use of EDM allows the construction of finer features than other machining methods, e.g. the pin 26, annulus 29 and shank 22 may have outer diameters of 2.5 mm, 3.2 mm and 19 mm respectively.

The bolt may be pre-relaxed (by tightening on a solid steel cylinder and placing it in an oven) prior to machining the gauge pin, such that the bolt has already had primary creep/relaxation prior to being placed in service. The device will then still measure actual elastic elongation (since plastic elongation due to creep/relaxation will be minimal). This is useful for high temperature joints. The process of pre-relaxing the bolt can be used on any bolt, particularly those used in high temperature environments and the bolts do not need to be load indicating bolts.

Tightening the bolt onto an item is one method of applying a load to the strainable portion in the same direction as an in use loading of that portion. Other means of applying load in that direction are possible.

Preferably the process for pre-relaxing the bolt is controlled based on the bolt material and the intended application temperature and bolt stress level. An exemplary pre-relaxation process involves stressing the bolt to a given bolt stress level which is in excess of the intended operating bolt stress but sufficiently low so as to avoid excessive yield at temperature, and placing it in an oven at a temperature that is hotter than the intended operating temperature, but lower than a temperature that will modify the material properties. The oven temperature is then maintained for a period of time, determined by previous testing of similar bolt materials under similar conditions, such that the primary rate of creep/relaxation has been exhausted and the bolt is now at a suitable secondary creep/relaxation rate such that a rate of secondary creep/relaxation is negligible compared to an elastic strain of the strainable portion. Whilst the oven might be held at a constant temperature, the characteristics of the heating might be varied to produce other temperature profiles.

Controlling the process parameters such that at the end of the pre-relaxation period the creep/relaxation rate is less than $4 \times 10^{-7}$ m/m/hr has been found to be highly desirable. This rate of creep/relaxation often corresponds to a nominal in service relaxation not more than 10% (based on a nominal service of 5 years at 80% of a creep temperature and an initial stress of 50% of a yield stress). This nominal service relaxation is sufficient for most purposes.

Achieving adequate pre-relaxation may require the bolt to be removed and retightened periodically, depending on the material, the bolt stress, the oven temperature and the intended operating conditions. For the avoidance of doubt, "heating for a period" and similar words as used herein take in the possibility of heating for two or more separate sub-periods.

Preferred forms of the described process result in a selected secondary creep/relaxation rate that is minimal by comparison to the expected bolt elastic elongation, ensuring that the load measurement corresponds substantially to the elastic elongation, rather than the combined elastic-plastic elongation of the bolt.

Creep is the elongation of the material under constant stress, relaxation is the loss of load under constant deflection. Relaxation occurs at a much lower temperature than creep and is due to micro-plasticity of the material. The microstructures of some materials will undergo more relaxation than others. For example, alloys intended for very high temperature uses will likely be less responsive to the pre-relaxation treatment disclosed herein, whereas cheaper more popular alloys can be pre-relaxed to a point where in-use relaxation is at the secondary creep/relaxation strain rate. For such lower alloy materials, imparting an initial creep strain into the bolt during the pre-relaxation treatment ensures that the strain rate once it is placed into service will be significantly lower. This is particularly the case in services where the creep rate will not be very high and relaxation is the primary cause of bolt load loss. So the pre-relaxation process enables the use of low alloy and less expensive higher alloys in place of expensive high temperature alloys for bolted joints that are operating at a temperature where creep is not significant but relaxation causes loss of bolt load to the point where joint integrity is compromised. Bolt relaxation can compromise joint integrity so that in a pressure boundary bolted joint there is leakage and, in a structural type joint such as a compressor casing or similar, the bolt load loss is to the point that the bolt will be at risk of fatigue and/or other parts of the structure will become over-stressed.

While in most cases the heating of the bolt would exceed a nominal creep temperature of the bolt material and would be less than a maximum temperature limit set as the lower of the annealing temperature for the material or the temperature that causes detrimental microstructural changes (such as the precipitation of carbides to the grain boundaries in some material for example, i.e. adversely affecting microstructural changes of the strainable portion of the bolt), the heating temperature may be in as broad a range as from 80% of the creep temperature up to the maximum temperature limit. Preferably the heating temperature is within 30% to 90% of a range defined from the creep temperature to the maximum temperature that causes detrimental changes to the bolt material. Similarly while the load applied to the bolt during the pre-relaxation process is preferably equivalent to between 50% of the yield stress in the strainable portion of the bolt at ambient temperature and 100% of the yield stress at an operating temperature of the bolt, it is more preferably equivalent to at least 75% of the yield stress at ambient and less than the yield at an operating temperature of the bolt. Heating close to the maximum temperature, applying a load of at least 75% of yield at ambient temperature and reapplying the load as the bolt relaxes all accelerate the pre-relaxation process. Therefore it is also desirable to remove and retighten periodically to accelerate the accumulation of strain during the pre-relaxation treatment. It would be advantageous to use a long oven to accommodate a full length of threaded bar used for stud bolts.

Figure 22:
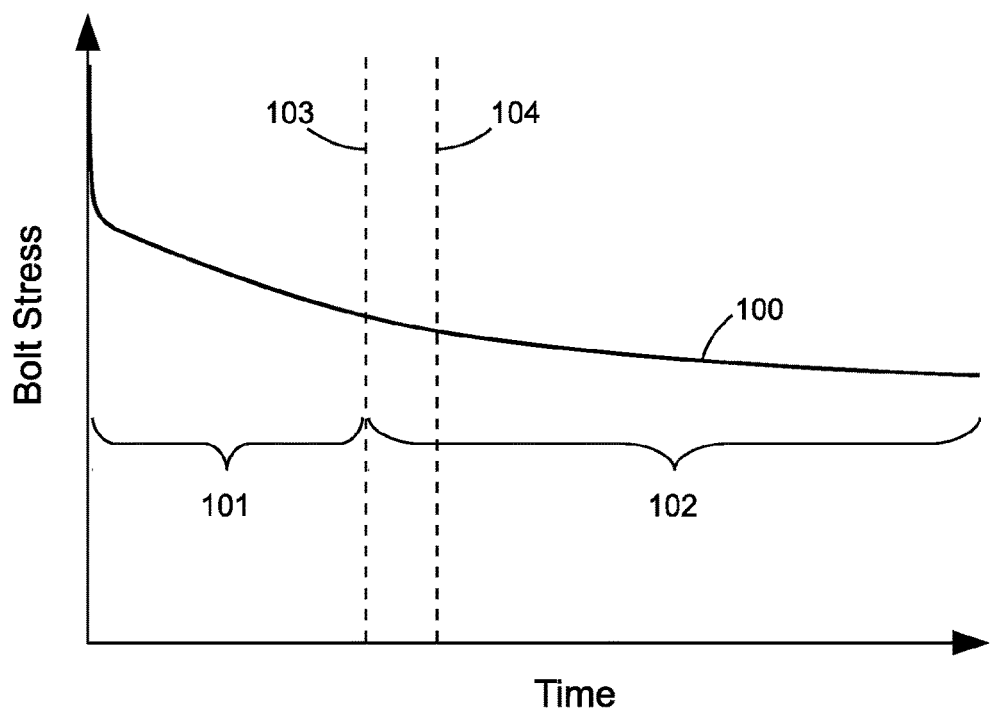
FIG. 22 is a graph of bolt stress vs time.

FIG. 22 shows a graph of bolt stress vs time for a bolt that is assembled on a solid steel cylinder and heated. The slope of the curve 100 is the creep/relaxation rate. The region 101 from zero time up to the time indicated by the line 103 the relaxation rate is a primary creep/relaxation rate. After that time, the creep/relaxation rate begins to approach a low rate, through which time the process is known as secondary creep/relaxation, region 102. In some cases the pre-relaxation treatment is carried out to exhaust the primary creep/relaxation, so the bolt is loaded and heated for the time indicated by the line 103. However it can be advantageous to use a slightly longer time pre-relaxation treatment time as indicated by the line 104, going past what would be traditionally called the point of transition between primary and secondary. The benefit of using the slightly longer pre-relaxation treatment time is that the bolt material is to ensure that, for most purposes, the rate of secondary creep/relaxation will be negligible compared to the bolt assembly elastic strain.

The datum 25 is defined by the strainable portion 22, i.e. it does not sit higher up within or above the head 21 of the bolt or in the load receiving portion of the thread. Locating this datum in this region removes the influence on the relative displacement of the datums 25, 27, of the complex stress and deformation patterns within the head 21.

FIG. 10 shows the stud bolt of FIG. 8 assembled with a first nut 42 engaging the first load receiving portion 36 of the external thread 43 near the measuring access end 44 of the bolt. A second nut 45 is shown towards the opposite end of the bolt 20 in the stud bolt assembly 41 to enable load to be applied and reacted by the first and second nuts. The second nut engages the thread 43 over a second load receiving portion 46. The strainable portion 47 is the region of the bolt between the first and second load receiving portions 36 and 46. The hole 48 from the measuring access end of the bolt includes the bore portion 23 ending in a datum step 49 at its inner end. The threads of the end portion 24 of the hole 48 are multi-purpose. During ordinary use of the bolt in typical operating environments the threads co-operate with a plug 50 which blocks access to the datums 25, 27 to shield them from debris that might otherwise settle on the datums (and thus make accurate measurement impossible) or bind within the gap 29 to give a false reading. The plug 50 also protects the datums from corrosion and other environmental degradation. Potentially a desiccant or an inert gas may be sealed in by the plug as a further means of protection. The plug 50 sits within the hole 48, as opposed to a cap that might sit over an external feature on the measuring access end 44 of the bolt to cover and protect the bore 23. Other closures are possible.

In typical operating environments, to measure the load on a bolt the plug is removed and a measuring tool screwed in its place. In more aggressive/hazardous environments, such as underwater, a measurement tool may remain permanently engaged with the threads to protect the interior of the bolt, e.g. to prevent the ingress of seawater, corrosion of the datum and reduced operational lifespan of the bolt load measurement device.

FIG. 11 illustrates the principal components of a measuring tool 60 which in and of themselves constitute a tool. These principal components include an outer tubular datum contacting portion 61 for making contact with the strain portion datum of the bolt, and another datum contacting portion 62 in the form of a pin internally carried within the portion 61 for making contact with the reference datum on the end of the reference pin of a bolt. The pin or measuring rod 62 is mounted to axially slide within the sleeve 61 and a strain gauge 63 carrying diaphragm 64 is mounted to detect this movement. The sleeve 61 is dimensioned to align and support the pin 62 to substantially eliminate error inducing lateral movement at the pin 62.

As previously noted there is preferably an axial distance from the highest point of the reference datum to the highest point of the strain portion datum of less than $\frac{1}{1000}$th of an axial distance from the reference datum to the root of pin. Preferably however, each of the datum contacting portions preferably has a maximum axial run-out of $\frac{1}{1000}^{th}$ of the distance from the reference datum of the member to the root of the pin, regardless of how it is formed. This limits variations in measurement associated with rotatable measuring tools.

The portion 61 has a disc-like head 65 from which a circular rim 66 axially projects. That rim is spanned by the diaphragm 64 such that the diaphragm resists the pin 62 retracting into the tool. In doing so the diaphragm 64 deforms so as to have a bell curve-like transverse cross-section. Strain gauges 63 mounted on the diaphragm detect this deformation. The diaphragm offers some resistance to this deformation whereby the reference datum contacting portion or pin 62 is urged to remain in contact with the reference datum 27 of a bolt being measured.

Similar diaphragms and strain gauges are known in the context of pressure measurement. By drawing on technology from this non-analogous art, the present inventor has realised significant efficiencies and increased accuracy of measurement. Desirably the strain gauge may operate on a voltage low enough to suit explosive environments.

Desirably the tubular portion or sleeve 61 is dimensioned for a close sliding fit within the bore 23 of a bolt and so as to seat against the reference datum 25 of the bolt without contacting the strain portion datum 27 of the bolt. The pin or measuring rod 62 is dimensioned to seat on the reference datum 27 without contacting the strain portion datum 25. This close sliding fit means that the tubular probe is aligned precisely by the tight tolerances between its outer shaft and hole in the bolt. This alignment leads to better measurement accuracy over existing devices in which the alignment is made only using the contact surfaces on the bolt head. The inventor has observed that when using such existing devices the read out value changes by about 10% if you rotate the device or remove and replace the device. This is due to the relatively small contact area used to align the device to the bolt. The described close sliding fit substantially eliminates this variation (i.e. error). The engagement between the cylindrical exterior of the portion or sleeve 61 and the cylindrical interior of the bore of a bolt to be measured is a translational sliding engagement (as opposed to, say, a helical sliding engagement in a threaded connection). Of course cylindricity is not essential. Profiles other than circular are possible.

FIG. 12 shows a measuring tool 30 comprising the principal components shown in FIG. 11 and a retaining cap arrangement 80 to locate the measuring tool to the thread in the end of the hole of a bolt. As in FIG. 11, the measuring tool includes a pin or measuring rod 62 within a sleeve 61, the inner end of the measuring rod 62 having a diaphragm contacting surface 71. The sleeve 61 has a probe portion 72 and, at one end, a flange portion 65. A diaphragm 64 is arranged across the flange portion 65. In use, the diaphragm contacting surface 71 of the measuring rod pushes on the diaphragm 64. The other end, being the external end, of the measuring rod 62 has a reference datum engaging surface 73 to engage the reference datum of a bolt.

The measuring rod also includes a ridge 74 co-operable with a complementary formation within the sleeve 61 to prevent the rod 62 from extending too far relative to the sleeve 61 so as to retain the rod 62 at least partly within the sleeve 61.

The sleeve 61 is held in a two piece housing (the retaining cap arrangement 80) comprising a body 81 and a cap 82. The outer surface 75 of the probe portion 72 of the sleeve is preferably a sliding fit inside the bore 23 of the bolt to be measured. A thread or other form of retaining region 83 on the housing is provided to enable the measuring tool 60 to be anchored to the bolt during measurement. A spring or other resilient member 84 between the housing cap 82 and a cap 76 on the flange ensures that when the measurement tool is engaged with a bolt, a strain portion datum engaging end 77 of the sleeve is pushed with a controlled force onto the strain portion datum.

Deformation of the diaphragm 64 by the measuring rod 62 is measured by strain gauges 63 connected by wires 78 to a measurement display unit (not shown). Other arrangements are possible, such as locating the signal conditioning components in the measurement tool and using a wireless link to a measurement display unit.

A non-circular bore profile can be engaged by a measuring tool having a complementary non-circular profile to substantially prevent rotation of the tool about the axis of the gauge pin, e.g. the tool may have a keyway in which a key of the bore is received or vice-versa. The inclusion of features co-operable to limit rotation of the tool relative to the member is another means of improving accuracy.

The measuring tool 60 is but one example of a mechanical load checking tool that may be advantageously used in conjunction with the described members. In contrast to non-contact tools mechanical load checking tools are characterised by having at least one dedicated datum contacting portion for each of the datums. Mechanical load checking tools are often simpler, more robust, less sensitive to temperature and of lower cost than other options.

Figure 4:
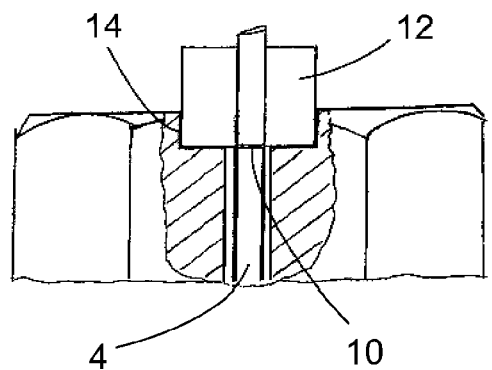
FIG. 4 is a partially cut away partial side view of another prior art bolt and measuring tool.
Figure 5:
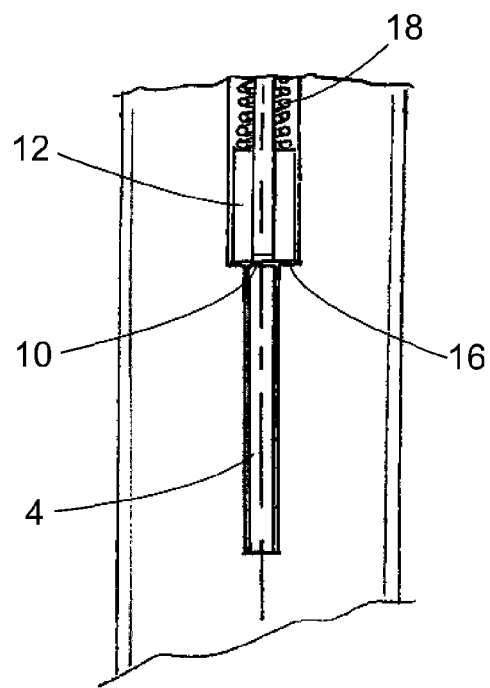
FIG. 5 is a schematic cross-section view of a portion of another prior art bolt and measuring tool.

The inventor has recognised that the tool taking its alignment from the bore is a significant advance over existing arrangements in which alignment is taken from a surface transverse to the gauge pin, e.g. over the variant of FIG. 4 of UK patent application no. GB 2 372 826 A (herein FIG. 5) in which the probe is biased against the step to fixedly locate the probe relative to the step.

The significant advance arises because despite all reasonable manufacturing precautions being taken, no surfaces are truly planar. Rather, nominally planar surfaces are in fact irregular albeit if only at a microscopic level. These irregularities can result in misalignment of the tool and in turn to measurement error. The larger a surface is, the more difficult it is to keep within a given flatness tolerance.

Figure 13:
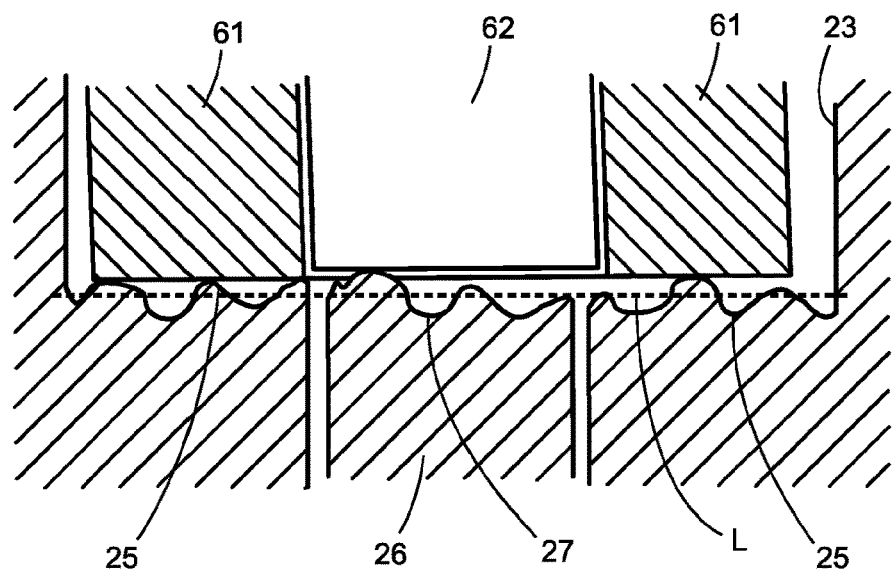
FIG. 13 is an exaggerated cross-section view of the interface between the datums and a misaligned measurement tool.

FIG. 13 schematically illustrates an interface between a variant of the system incorporating a sleeve portion 61 of reduced diameter or insufficient bore length so that the measuring tool does not take its alignment from the wall of the bore 23, but rather from one of the datum surfaces, in this case from surface 25. Surface irregularities are greatly exaggerated in the Figures. As suggested by the line L, despite these irregularities the surfaces 25, 27 are nominally co-planar. Nonetheless, as will be apparent, these irregularities result in the tool being cocked and in an erroneous measurement suggesting that the datum 27 is proud of the datum 25.

Figure 14:
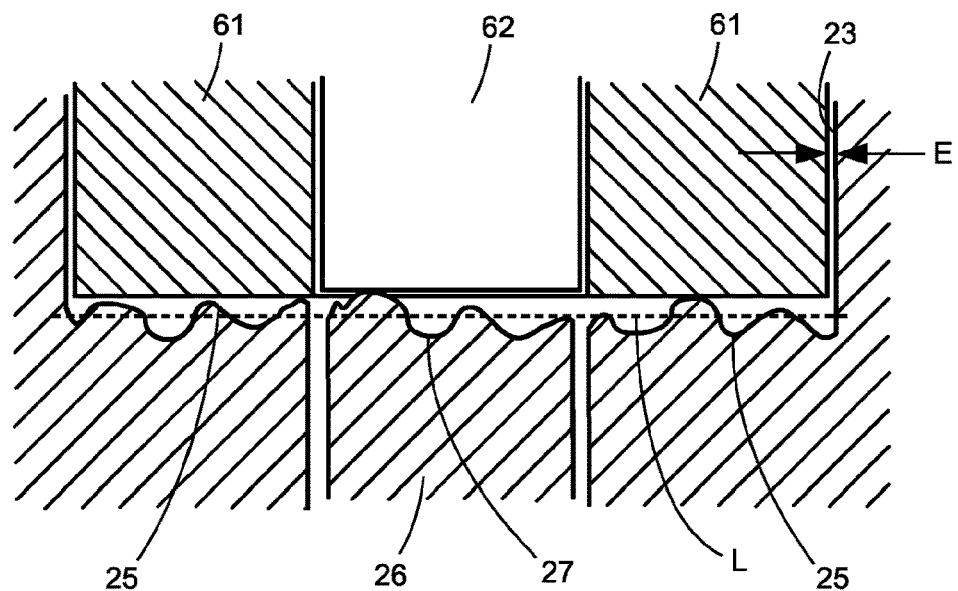
FIG. 14 is an exaggerated cross-section view of the interface between the datums and an aligned measurement tool.

FIG. 14 is a schematic similar to the schematic of FIG. 13 but for an engagement E between the wall of the bore 23 and the tool. The engagement E, a radial clearance toleranced for a running or sliding fit, ensures that the axis of the tool is parallel to the axis of the gauge or reference pin 26 and in turn a respective high point of the each of the datums 25, 27 is picked up, leading to a more repeatable measurement. The axis of the tool is thus held perpendicular to the (nominally) planar datums using a repeatable method.

Moreover, the engagement E means that the datums 25, 27 are released from the tool-aligning function that they might otherwise serve and therefore may be smaller than would otherwise be required. Because the datums are smaller, surface irregularities can be minimised or, put another way, a tighter flatness tolerance can be maintained. This contributes to the accuracy of the measurement.

By checking the relative disposition of the high points during manufacturing and if necessary re-machining, the initial alignment of datums can be very tightly controlled using relatively low cost manufacturing techniques. The initial alignment is controlled to within suitable tolerances so that tools can be calibrated with standard calibration blocks.

By way of example, satisfactory accuracy for many applications can be achieved using a 25 mm root-to-datum dimension and an initial alignment tolerance between the datums (or more specifically the high point of the datum 25 and the high point of the datum 27 as discussed above) within 12.5 µm. More accurate applications may require a tolerance of half this value. Preferably the axial distance between the high points of the datums 25, 27 is less than $1/1000^{th}$ of the length of the reference pin, preferably less than $1/2000^{th}$ (i.e. 12.5 µm for a 25 mm long reference pin) and in more accurate applications, less than $1/4000^{th}$ of the length of the reference pin.

These tolerances are readily achievable using the described low cost manufacturing techniques. In contrast, achieving similar results would be much more difficult (i.e. much more expensive) using arrangements as in FIG. 4 of UK patent application no. GB 2372 826 A (herein FIG. 5) and FIG. 13. It would be much more difficult because achieving the same accuracy would require the cumulative errors across the entire datum surface under the measurement probe and relating to flatness, parallelism, perpendicular and co-planar to be held all within the same overall tolerance, which is much more difficult due to the possible combinations of error accumulation. In addition, the non-contact method of measurement of GB 2 372 826 is inherently more sensitive to surface condition than the present contact measurement method.

Similar comments apply in respect of the arrangement of FIG. 2 of UK patent application no. GB 2 372 826 A (herein FIG. 4). Whist that arrangement includes a close sliding fit within a bore that would assist with concentrically aligning the end of the tool with the datum, that bore is much too short to limit angular misalignment, i.e. to limit misalignment of the type illustrated in FIG. 13.

Figure 15:
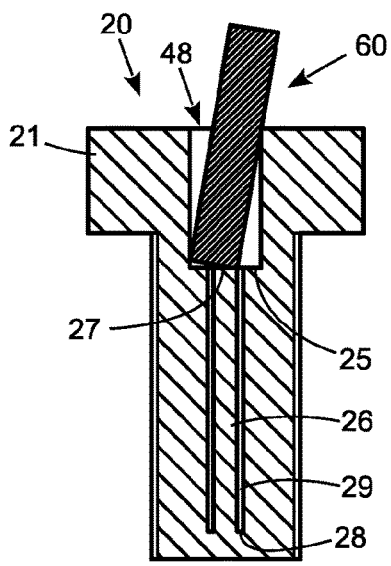
FIG. 15 is an exaggerated cross-section view of a bolt and a misaligned measurement tool.

The advantageous engagement E arises from a combination of the fit (relating to the radial clearance) and the length of the engagement. FIG. 15 is an exaggerated schematic of misalignment of a measuring tool 60 resulting from a loose fit. Measurements would vary as the tool is rotated or otherwise manipulated. Likewise, even a very tight fit in a short bore such as the bore of FIG. 2 of UK patent application no. GB 2 372 826 A (herein FIG. 4) would allow for tool misalignment and in turn to appreciable variations in measurement as the tool 60 is rotated or otherwise manipulated within the hole 48.

If a sliding fit is used, accuracy sufficient for most purposes can be achieved whilst the length of the bore portion is reduced to 1.5 times or even equal to the bore diameter, particularly if a short bushing is also provided in the hole axially spaced from the bore portion to assist with alignment of the probe portion of the measurement tool. So the ratio of bore portion length to diameter is preferably at least 1:1, more preferably at least 1.5:1, at least 2:1 or at least 3:1. Where a ratio of 1.5:1 or less is used, preferably the fit between the bore of the bolt and a probe portion of a measuring tool is a sliding fit to ensure misalignment is minimised.

The fit between the bore of the bolt and a probe portion of a measuring tool is preferably at loosest substantially an RC 6, i.e. at loosest a medium running fit. The (ANSI) RC 6 fit falls between the ISO Free Running and Easy Running fits, all three of which require an H9 hole tolerance at loosest. An H9 bore will form a suitable fit with tools of nominally the same diameter and formed to ISO e8 or better (e.g. f8, f7, e7, g6 or g7, the tolerances for ANSI RC 5 and RC4 and ISO Easy Running or Sliding fits). The H9 tolerance is preferably applied as an H9$\text{\textcircled{E}}$ tolerance, i.e. H9 with the envelope specification to simultaneously limit wavy or otherwise bent bores as well as the bore diameter.

To account for non-cylindrical bores (such as a cylindrical bore extended by a keyway), the square root of the bore's cross-sectional area is a suitable substitute for the diameter in the above calculations. For the avoidance of doubt, in this context and in similar contexts herein, references to a bore's diameter and/or cross-sectional area are in respect of the bore's relevant measuring tool engaging portion(s).

Figure 16:
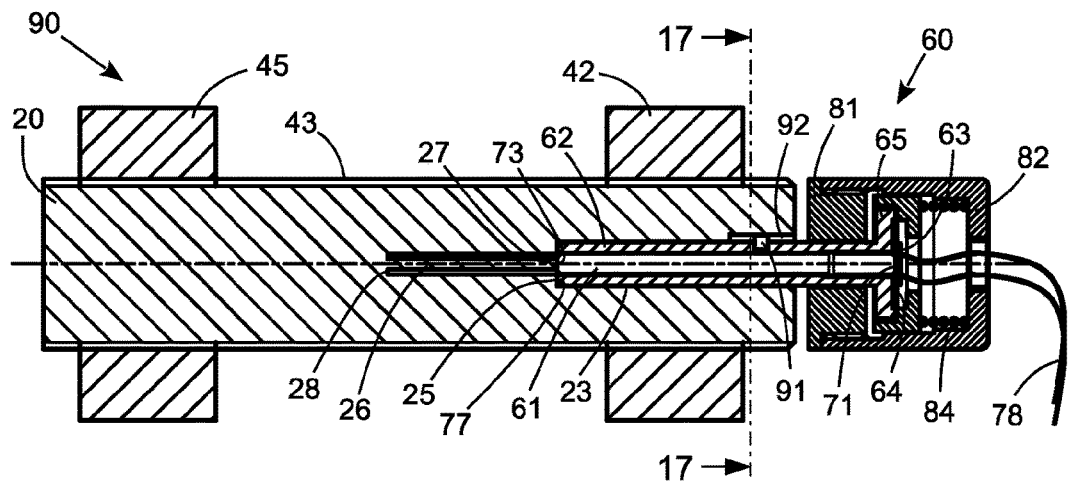
FIG. 16 is a cross-section view of another tool engaged with a stud bolt.
Figure 17:
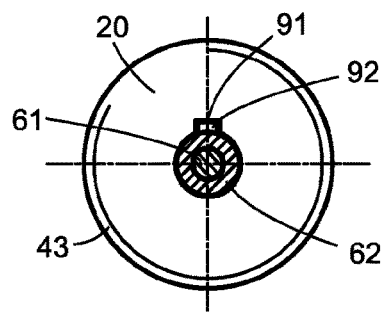
FIG. 17 is a cross-section view corresponding to the line 16-16 in FIG. 16.

FIG. 16 shows a system 90 including a stud bolt 20 and a tool 60. The measuring tool 60 includes a key 91, and the bolt 20 includes a complementary keyway 92, to rotationally orient the tool relative to the bolt. FIG. 17 is a perpendicular cross-section as indicated by the arrows 16-16 in FIG. 16. No retaining region is shown in FIG. 16 and the measuring tool 30 can be manually held in place, although use of a retaining region able to hold the measuring tool in place and/or to retain a plug or cap is preferable. In this example, the key 91 and keyway 92 are axially spaced from the engaging portions of the bore 23 and tool (sleeve 61 of the probe portion).

Whilst the tool-engaging portion of the bore preferably has a substantially uniform profile, it is also contemplated that the bore may vary in profile along its axial length. By way of example a bore may be formed with a pair of guide rings axially spaced from each other by a relieved portion of greater diameter. Likewise, the engaging tool could be formed with a pair of guide rings axially spaced from each other along the sleeve portion to engage the bore whereby the engagement is a discontinuous engagement. In either case the lengthwise axial separation of the outer most portions of the rings can be substituted for the length in the above calculations. Of course the ends of a single cylindrical engagement region are two locations spaced by an axial length.

Likewise, whilst a substantially conformal fit between the tool and the bore is preferred, other forms of engagement are possible. By way of the example, the wall of the bore may include inwardly directed splines defining separate lines of contact with a cylindrical tool exterior.

The components of FIG. 11 when coupled to suitable data acquisition equipment to read the strain gauge could be used as a load monitoring tool by simply handling the head of the portion 61 to insert it into the bore 23. The data acquisition equipment may include a standard instrument (gauge meter) for measurement of the bolt load (single channel hand-held device or, in the case of multiple bolts being measured simultaneously, a multi-channel data-logger). The data acquisition equipment may simply record the read out value from the strain gauge, but preferably includes (or is linked to) a display to display that value.

Simply handling the head of the portion 61 may entail some error depending on how hard the operator pushes the tool in place. Accordingly the tool 60 preferably includes a housing 80 and a spring arrangement 84 as shown in FIG. 12 which serve to control the force by which the key components 61, 62 are inwardly urged. The housing 80 encloses the head of the portion 61 and the diaphragm 64. In some variants the enclosure may be a sealing enclosure to suit operation in aggressive (e.g. underwater) and/or hazardous (e.g. explosive) environments. The housing includes an externally threaded tubular boss 83 through which the portions 61, 62 project from the housing 80.

The externally threaded tubular boss threadingly engages the threads of the retaining region 24 at the end of the hole in the bolt to mount the measuring tool 60. The housing 80 is configured for simple hand manipulation to screw the tool in and out. The tool 60 is easily removable and can be easily moved from bolt to bolt rather than being an integrated part of a bolt. The tool 60 is also convenient in that it can easily be calibrated in the field using a calibration block.

The spring arrangement 84 is a compression spring arrangement acting between a roof of the housing 80 and the annular rim of the portion 61 to downwardly drive that portion relative to the housing. When the housing 80 is screwed into the bolt 20, the portion 61 abuts the datum 25, so that it cannot move inwardly. As the housing is further screwed in, the head 65 of the portion 61 relatively moves within the housing 80 to compress the spring arrangement 84. The housing 80 is screwed in until it abuts a stop (the end face of the bolt 20 in this case). The spring arrangement may be a helical compression spring. Alternatively it may be a series of wave springs to provide a more uniform distribution of pressure on the portion 61.

The measuring tool 60 may also be left in place as part of an automatic load maintaining system including a mechanism for varying load (e.g. for turning a nut or bolt head) responsive to the strain gauge. Of course sensors other than strain gauges are also possible. A Linear Variable Differential Transformer is another example of a sensor that may be employed. The materials of construction for the measurement device can be non-conductive (thermally) and external cooling/heating may be applied, making it capable of measuring bolt load at a wide range of temperatures either intermittently or continuously. The portions 61, 62 can be constructed from steel or, in the case of a high temperature gauge, a thermally insulating ceramic material.

When the bolt is tightened, the pin 26 remains unstressed whereas the strainable portion 47 is loaded and stretches. The relative displacement of the datums 25, 27 when the bolt is so loaded corresponds to the amount by which the material between the strain portion datum 25 and the root 28 has extended. Thus the lengthwise dimension from the datum 25 to the root 28 is an important dimension. By knowing this length and the elastic properties (e.g. Young's Modulus) of the bolt material, the load can be determined based on the measured relative displacement and in turn data processing equipment associated with the measuring tool 60 can be calibrated to provide an output indicative of the load. If the datums of an unloaded bolt are co-planar (or preferably the planes passing through the high points on the datums are separated by less than $\frac{1}{2000}^{th}$ of the axial length of the pin, each plane being perpendicular to the major axis of the bore), this important dimension (between the strain portion datum 25 and the root 28) corresponds to the length of the gauge (reference) pin 26.

Longer datum to root dimensions produce a proportionately larger relative displacement between the datums 25, 27 for a given strain. Thus, when a bolt is to be subject to pure tension, a longer datum to root dimension will produce more accurate results. 12 mm is considered a practical minimum for many applications.

Figure 18:
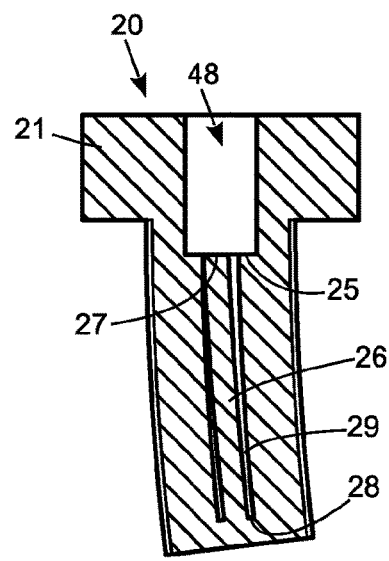
FIG. 18 is an exaggerated cross-section view of a bent bolt.

On the other hand, longer datum to root dimensions are more difficult to manufacture and can lead to inaccuracy if a bolt is subject to bending. 75 mm is considered a practical maximum required for many applications. FIG. 18 is an exaggerated schematic view illustrating how bending can lead to misalignment of the datums of similar effect to the misalignment contemplated in FIG. 15.

The transfer function that gives load as a function of the relative displacement of the datums varies based on the important root to datum length, the cross-sectional area of the strainable portion, and the material properties. Thus a set of bolts that were formed of differing materials but otherwise identical would require differently calibrated measuring tools to measure their output.

Accordingly it is proposed that bolts of differing material be shaped differently to permit checking with a common tool (i.e. without modification of, recalibration of, or changing settings on, the tool). In a simple form, the initial relative disposition of the datums 25, 27 could be varied, e.g. by lengthening the pin 26, so that the datums of differing bolts move to a common relative disposition when a critical load is reached. This would permit a simple check of whether the critical load has been reached with a common tool.

More preferably the critical length from the datum 25 to the datum 27 is varied so that the transfer function that gives load as a function of relative displacement is consistent across a set of bolts formed of dissimilar materials. This configuration allows a common tool to measure (i.e. to provide an accurate numerical output of) the load on each of the bolts.

The pin 26 is relatively thin so as to minimise the reduction in the functional cross-sectional area of the strainable portion 47. Since it is inextensible, workable variants of the bolt 20 may have longer or shorter pins 26, although it is preferred that the end of the pin 27 is within the strainable portion, and most preferably that datum 27 is co-planar with a datum 25 (or at least that a measuring tool measures the relative disposition as less than a maximum tolerance value) when the bolt is not loaded. As discussed above, that maximum tolerance value is preferably 12.5 µm for a 25 mm long pin 26. The thin pin 26 is safely housed within the bolt 20 and thus shielded from damage.

Of course the shape of the tool 60 is complementary to the shape of the bolt 20. The described geometry of the datums 25, 27 results in the measuring rod portion 62 likewise being safely housed within the sleeve portion 61 along at least most of its length. Thus it too is shielded from damage.

Figure 19:
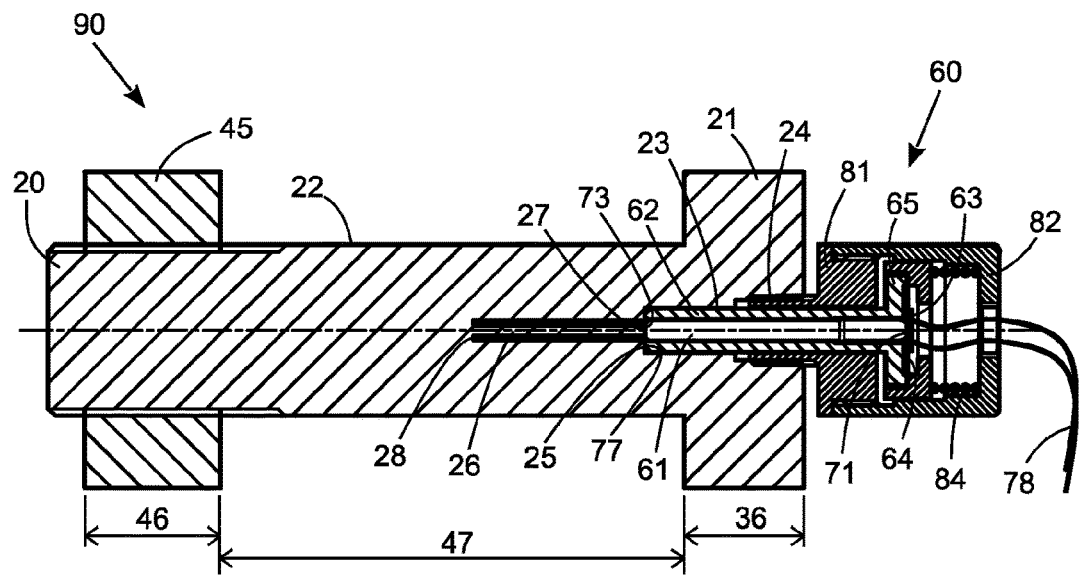
FIG. 19 is a cross-section view of the tool of FIG. 12 engaged with the bolt of FIG. 6.

FIG. 19 shows a system 90 including a bolt type of fastener 20 having a head 21 and a shank 22, with the measurement tool 60 engaged, ready for measurement of the elongation and therefore the load. The first load engaging region 36 is now the bolt head 21. The gauge length, the reference pin 26, the root 28, reference datum 27 and strain portion datum 25 are again all located within the shank 22 and therefore within the strainable portion 47 of the fastener.

Figure 20:
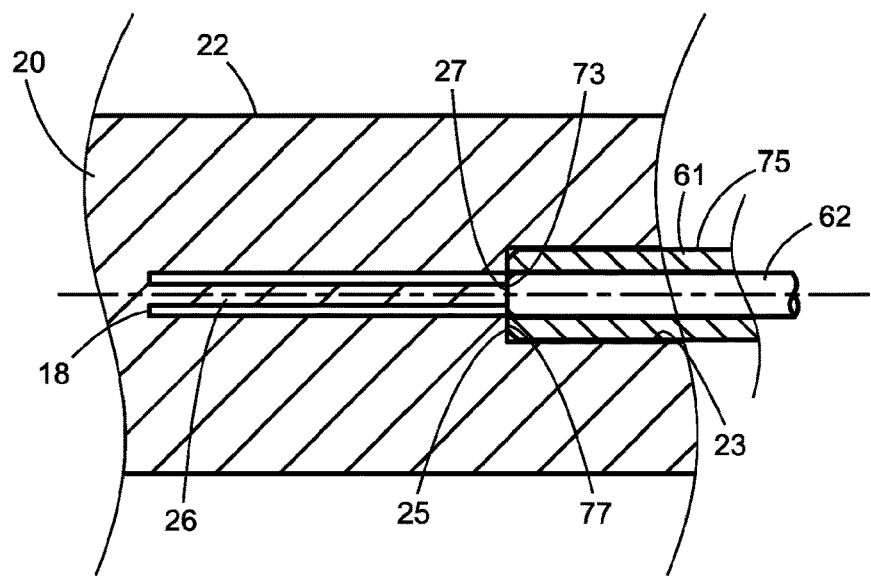
FIG. 20 is a partial view of the tool and bolt in FIG. 19.

FIG. 20 is a partial section of the system of FIG. 19 around the shank 22 and strainable portion of the fastener, showing the engagement of the outer surface 75 of the probe portion of sleeve 61 of the measuring tool inside the bore 23 of the fastener or bolt 20, with the strain portion engaging end 77 of the sleeve 61 contacting the strain portion datum 25 and the reference datum engaging surface 73 of the measuring rod 62 contacting the reference datum 27 on the end of the gauge or reference pin 26.

Figure 21:
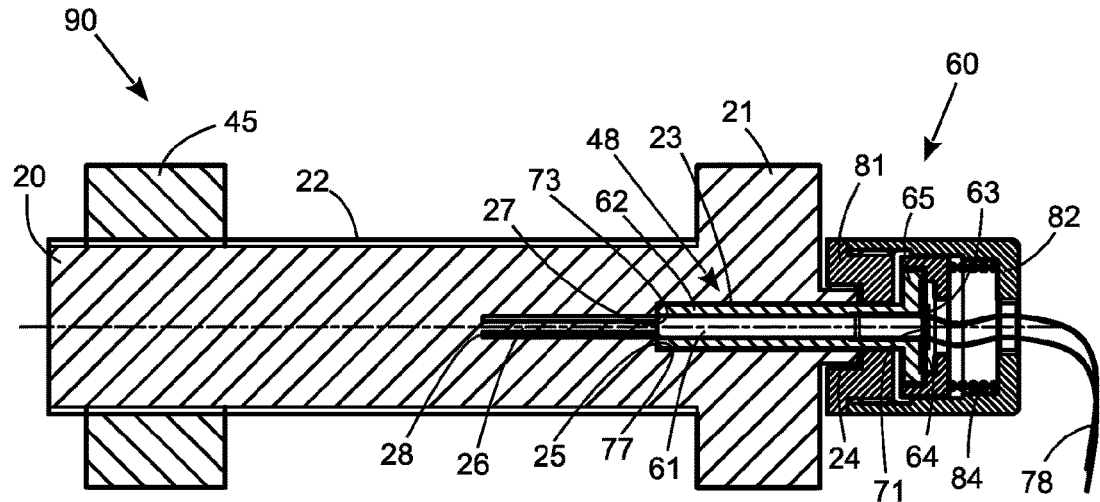
FIG. 21 is a cross-section view of another tool engaged with a headed bolt.

FIG. 21 shows a system 90 including a headed bolt 20 in which the retaining region 24 takes the form of an externally threaded tubular boss. As in various other members disclosed herein, the region 24 co-operates with, to retain, a protective cap and/or the measuring tool 60. Threads of the region are external to the hole 48. The retaining region 24 on the bolt 20 in this example is now a male thread and a female thread is now provided inside the housing body 81 of the measuring tool 60. This arrangement can be preferable for example on smaller diameter bolts or on bolts utilising a keyway as in FIGS. 16 and 17.

Preferred forms of the system made up of fastener 20 and measurement tool 60 are capable of sustained measurement at elevated temperatures, due to the combination of an integral pin that is identical to the bolt, minimal measurement contact surfaces and the ability to build the measurement device out of non-conductive materials (such as ceramic). The bolt material properties may be modified by pre-conditioning prior to installation of the measurement device in order to eliminate measurement drift associated with creep or relaxation of the components, which is an inherent problem with the load indicating bolts currently in use.

Due to the improved accuracy arising from the elimination of multiple components in the measurement system (e.g. relative to the bolt of FIG. 2 the elimination of a separable pin and sleeve) and improvements to the measurement device misalignment, a more sensitive gauge can be employed. This allows the use of a shorter dimension from the datum 25 to the root 28, which is advantageous in reducing temperature and bolt bending effects on the measurement. By way of example, a root to datum measurement of about 25 mm is contemplated, whereas about 50 mm is thought to be a practical minimum for the corresponding dimension in the bolt of FIG. 1. Bolts in the vicinity of Ø12 mm up to Ø200 mm or so are contemplated.

In the preceding discussion various examples of the invention are disclosed. The invention is not limited to these examples. Rather the invention is defined by the following claims.

That claimed is:

1. A fastener including:
    a first and a second load receiving portion;
    a strainable portion between the first and second load receiving portions;
    an elongate portion including a reference datum;
    a strain portion datum located on the strainable portion;
    axial displacement of the strain portion datum relative to the reference datum being proportional to a load on the fastener; and
    a hole from a measuring access end of the fastener towards the reference and strain portion datums to enable a measuring tool to access the reference and strain portion datums to check the load; wherein
    when the load is zero, the axial distance from the highest point of the reference datum to the highest point of the strain portion datum is less than ¹⁄₁₀₀₀th of an axial distance from the reference datum to a root of the elongate portion;
    the hole includes a bore to form an engagement to align the tool, the bore having a cross sectional area and a tolerance of no more than H9; and including one or more tool engaging portion(s) to form an engagement to align the tool;
    the tool engaging portion(s) being configured to engage the tool at at least two locations spaced by an axial length at least equal to the square root of the cross-sectional area.

2. The fastener of claim 1 wherein, when the fastener is not loaded, an axial distance from the highest point of the reference datum to the highest point of the strain portion datum is less than ¹⁄₂₀₀₀th of the axial distance from the reference datum to the root of the elongate portion.

3. The fastener of claim 1 wherein, when the fastener is not loaded, an axial distance from the highest point of the reference datum to the highest point of the strain portion datum is less than ¹⁄₄₀₀₀th of the axial distance from the reference datum to the root of the elongate portion.

4. The fastener of claim 1 wherein the elongate portion is integrally formed with the strainable portion; and
    wherein the reference datum is a free end of the elongate portion.

5. The fastener of claim 1 wherein the root of the elongate portion, the reference datum and the strain portion datum are located between the first and second load receiving portions.

6. The fastener of claim 1 wherein the bore has a radial run-out tolerance relative to the elongate portion of less than ¹⁄₂₀₀th of the axial distance from the reference datum to the root of the elongate portion.

7. The fastener of claim 1 wherein the tool engaging portion(s) have tolerance(s) no wider than H9E.

8. The fastener of claim 1 wherein the tool engaging portion(s) have tolerance(s) no wider than about H6.

9. The fastener of claim 1 wherein the axial length is at least equal to 1.5 times the square root of the cross-sectional area.

10. A system including the fastener of claim 1 and a measuring tool, wherein engagement between the measuring tool and the bore is at loosest a running fit.

11. The system of claim 10 wherein the engagement is at loosest substantially an RC 6 running fit.

12. The system of claim 10 wherein the engagement is at loosest substantially a sliding fit.

13. The system of claim 10 wherein the engagement is a close sliding fit.

14. The system of claim 10 wherein the tool is configured to produce a read out value.

15. The system of claim 10 wherein the fastener and the tool include features co-operable to limit rotation of the tool relative to the fastener.

16. A tool for checking a load on the fastener of claim 1,
    the tool including one or more portions shaped to engage the bore to align the tool;
    the engagement being at at least two locations spaced by an axial length at least equal to the square root of the cross-sectional area, and
    the bore engaging portions having tolerance(s) no wider than e8.

17. The tool of claim 16, further including two datum contacting portions arranged to in use pass through the bore to contact the datums of the fastener, and the two datum contacting portions being movable relative to each other to simultaneously engage both datums of the fastener.

18. A method of forming the fastener of claim 1;
    the method including removing material by contactless machining to define the datums.

19. The method of claim 18 wherein the contactless machining includes moving, relative to the fastener, a machining tool;
    the machining tool having a functional area which acts to form the datums;
    the moving being moving at least a portion of the functional area over, to act on, both of the datums to limit relevant process variation associated with wearing of the machining tool;
    the relevant process variation being variation in an axial disposition of a highest point of the datum relative to a highest point of the other datum.

20. The method of claim 19 wherein the moving includes rotating the fastener relative to the machining tool whilst the tool is laterally offset relative to the elongate portion.

21. The method of claim 19 wherein the moving includes rotating the machining tool relative to the fastener whilst the machining tool is laterally offset relative to the elongate portion.

22. The method of claim 19 wherein the moving includes relative lateral stroking.

23. The method of claim 18 including contactless machining to define a void surrounding the elongate portion.

24. The method of claim 18 wherein the contactless machining is electrical discharge machining (EDM).

25. The method of claim 18;
the method including removing material, to define the datums, in a single machining set up.

26. The method of claim 18, further including, prior to the removing material to define the datums:
removing material to define a pre-cursor to the bore; and
a subsequent operation to define the bore, more accurate than the removing material to define a pre-cursor to the bore.

27. The method of claim 26 wherein the subsequent operation is reaming.

28. The method of claim 18, further including the steps of applying a load to, and for a period heating, a length of bar used for the fastener, prior to the removing material to define the datums.

29. The method of claim 28, wherein the load, characteristics of the heating, and the period are selected to relax the strainable portion such that the fastener is capable of a nominal in service relaxation not more than a limit; the nominal in service relaxation being:
a reduction in stress within the strainable portion;
over a 5 year period at 80% of a creep temperature of the strainable portion; and
from an initial stress, within the strainable portion, of 50% of a yield stress of the strainable portion;
and wherein the limit is 10% of the initial stress.

30. The method of claim 28 wherein the load, characteristics of the heating, and the period are selected such that at the end of the period creep/relaxation rate of the strainable portion is less than $4 \times 10^{-7}$ m/m/hr.

* * * * *